(12) United States Patent  (10) Patent No.: US 8,041,949 B2
Isozaki et al.                   (45) Date of Patent:   \*Oct. 18, 2011

(54) INFORMATION PROCESSING SCHEME FOR REALIZING CONTENTS TRANSFER AND COPYRIGHT PROTECTION

(75) Inventors: Hiroshi Isozaki, Kawasaki (JP); Takeshi Saito, Meguro-ku (JP); Tatsuyuki Matsushita, Kawasaki (JP); Tooru Kamibayashi, Chigasaki (JP)

(73) Assignee: Kabushiki Kaisha Toshiba, Tokyo (JP)

( \* ) Notice: Subject to any disclaimer, the term of this patent is extended or adjusted under 35 U.S.C. 154(b) by 1497 days.

This patent is subject to a terminal disclaimer.

(21) Appl. No.: 11/071,252

(22) Filed: Mar. 4, 2005

(65) Prior Publication Data

US 2005/0216724 A1    Sep. 29, 2005

(30) Foreign Application Priority Data

Mar. 5, 2004 (JP) ................................. 2004-063000

(51) Int. Cl.
*H04L 9/32* (2006.01)

(52) U.S. Cl. ....... 713/168; 379/56.3; 713/150; 713/169; 713/153; 713/170; 713/172; 713/173; 713/174; 713/175; 713/176; 713/178; 713/179; 713/180; 713/181; 726/6; 726/27; 726/28; 726/29; 726/30; 705/57; 455/26.1; 455/422.1

(58) Field of Classification Search .................... 713/153
See application file for complete search history.

(56) References Cited

U.S. PATENT DOCUMENTS

| 6,704,871 | B1 * | 3/2004 | Kaplan et al. ................. 713/192 |
| 6,834,349 | B1 * | 12/2004 | Higurashi et al. ............ 713/193 |
| 7,287,282 | B2 * | 10/2007 | Yamada et al. ................. 726/26 |

| 2002/0157002 | A1 | 10/2002 | Messerges et al. |
| 2003/0045280 | A1 * | 3/2003 | Simons .......................... 455/422 |
| 2003/0145214 | A1 * | 7/2003 | Saito et al. .................... 713/189 |
| 2003/0198349 | A1 | 10/2003 | Aizu et al. |

(Continued)

FOREIGN PATENT DOCUMENTS

JP    2001-285284    10/2001

(Continued)

OTHER PUBLICATIONS

U.S. Appl. No. 10/599,958, filed Oct. 16, 2006, Saito et al.

(Continued)

*Primary Examiner* — Nathan Flynn
*Assistant Examiner* — Bryan Wright
(74) *Attorney, Agent, or Firm* — Oblon, Spivak, McClelland, Maier & Neustadt, L.L.P.

(57) ABSTRACT

An information processing system in which information transfers between communication devices through a network is limited within a prescribed range by registering unique information obtainable within the prescribed range into each device and permitting information transfer between devices which share common unique information, where the unique information is formed by a pair of public and secret unique information, a bridge device is controlled such that, upon receiving a proxy check request from a reception device, whether a transmission device is another bridge device or not is judged when the public unique information registered by the reception device is registered in the bridge device and one public unique information registered in the bridge device is registered by the transmission device. Then, the secret unique information registered by the reception device is transmitted to the transmission device when the transmission device is not another bridge device.

14 Claims, 23 Drawing Sheets

U.S. PATENT DOCUMENTS

| | | |
|---|---|---|
| 2003/0235175 A1* | 12/2003 | Naghian et al. ............... 370/338 |
| 2004/0039906 A1 | 2/2004 | Oka et al. |
| 2004/0053622 A1 | 3/2004 | Nakakita et al. |
| 2004/0158634 A1 | 8/2004 | Saito et al. |
| 2005/0027984 A1 | 2/2005 | Saito et al. |
| 2005/0101314 A1* | 5/2005 | Levi ............................ 455/423 |
| 2005/0118987 A1 | 6/2005 | Isozaki et al. |
| 2005/0216724 A1 | 9/2005 | Isozaki et al. |
| 2005/0259824 A1 | 11/2005 | Isozaki et al. |
| 2005/0286437 A1 | 12/2005 | Matsushita et al. |
| 2006/0005259 A1 | 1/2006 | Isozaki et al. |

FOREIGN PATENT DOCUMENTS

| | | |
|---|---|---|
| JP | 2002-024179 | 1/2002 |
| JP | 2002-300162 | 10/2002 |
| JP | 2004-048493 | 2/2004 |
| WO | WO 02/30054 A1 | 4/2002 |

OTHER PUBLICATIONS

Taro Yoshino, "Napster can be tool to help Internet business", Nikkei Electronics 780, Nikkei Business Publications, Inc., Oct. 9, 2000, p. 125-145 (with English Abstract).

* cited by examiner

| INDISPENSABLE ITEMS | | OPTIONAL ITEMS | |
|---|---|---|---|
| PUBLIC UNIQUE ID | SECRET UNIQUE ID | REGISTRATION TIME | UNIQUE INFORMATION GENERIC TO DEVICES |
| XX | x | M1/D1 H1:M1 | XX:YY:ZZ:AA |
| AA | A | M2/D2 H2:M2 | AA:BB:CC:DD |
| EE | E | M3/D3 H3:M3 | EE:FF:00:11 |
| ... | | ... | |

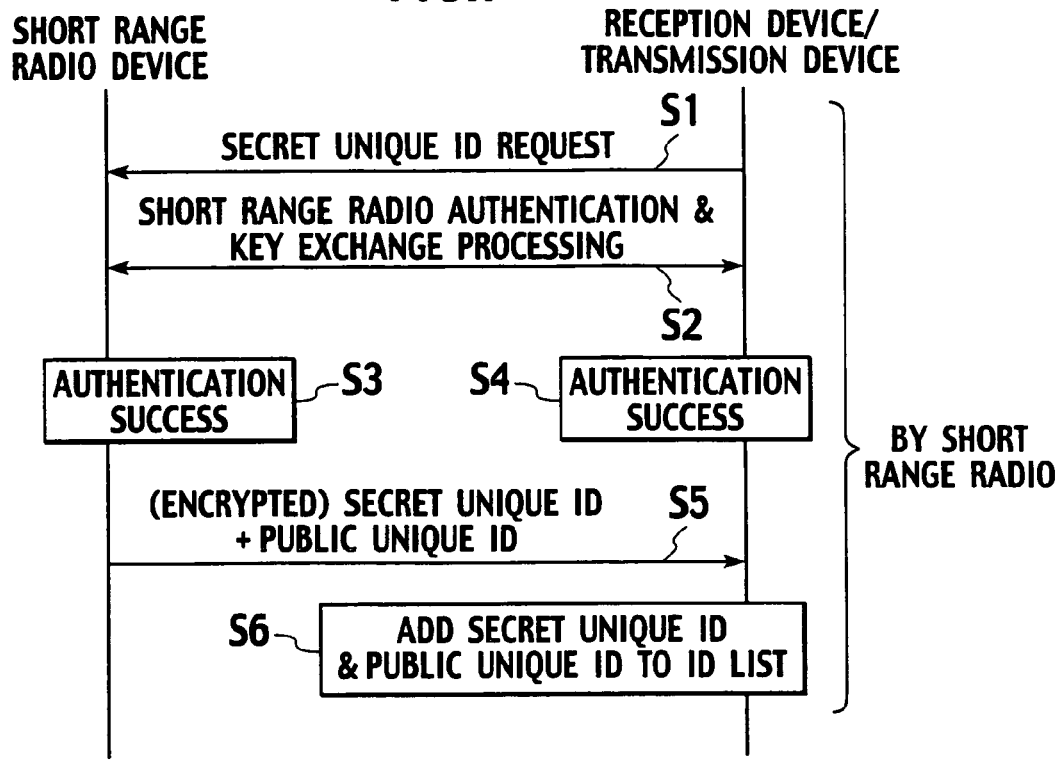
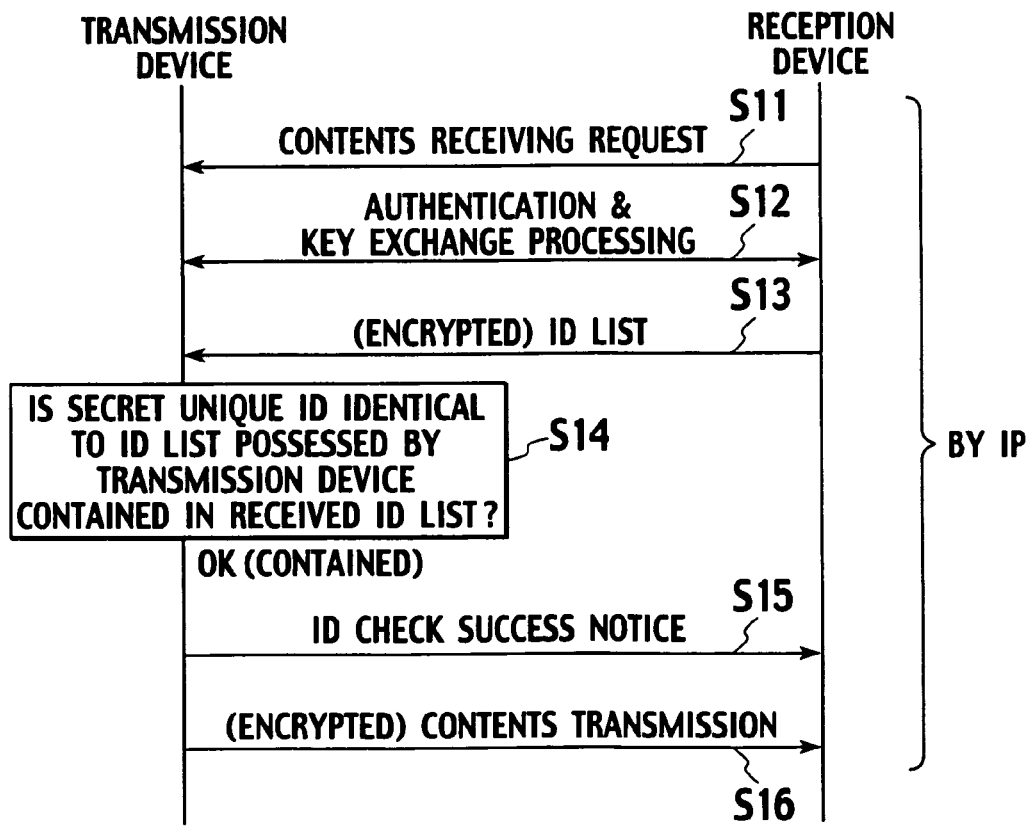

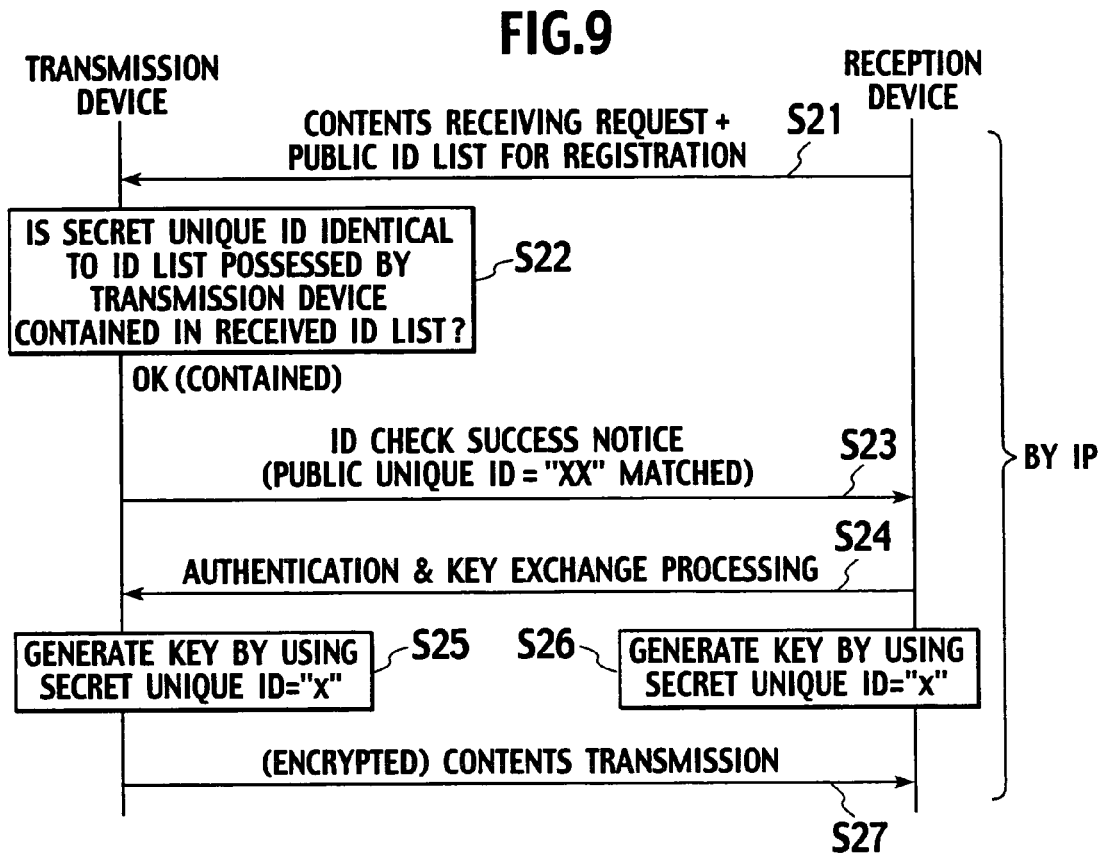
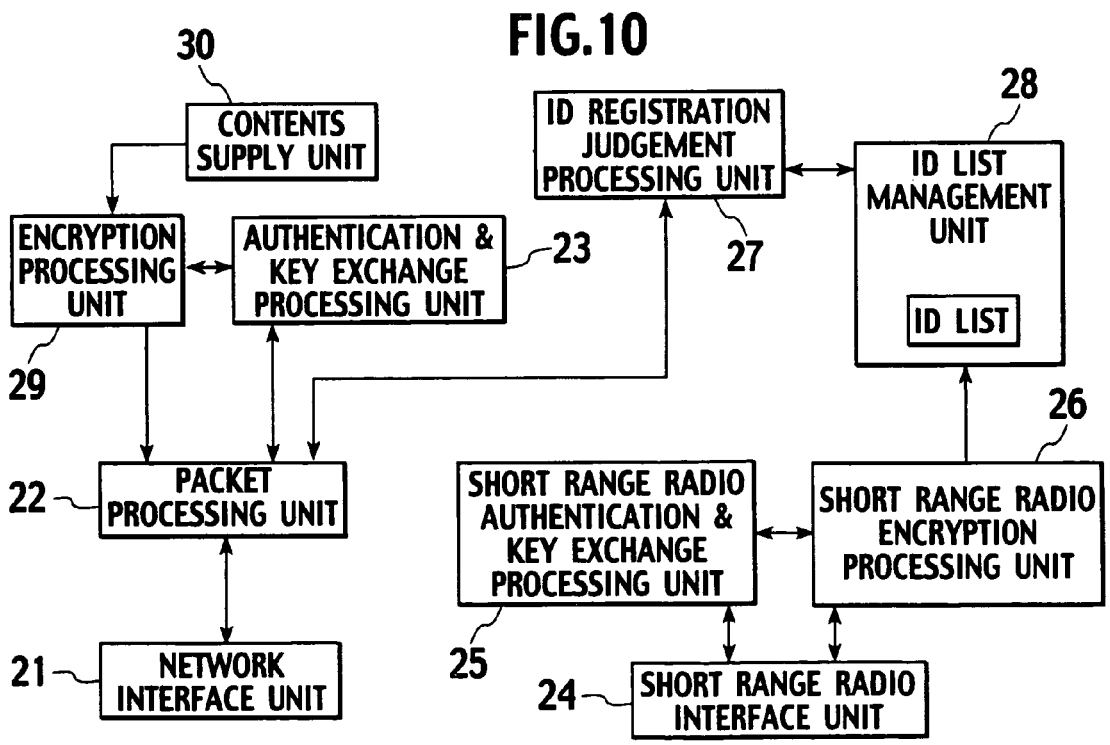

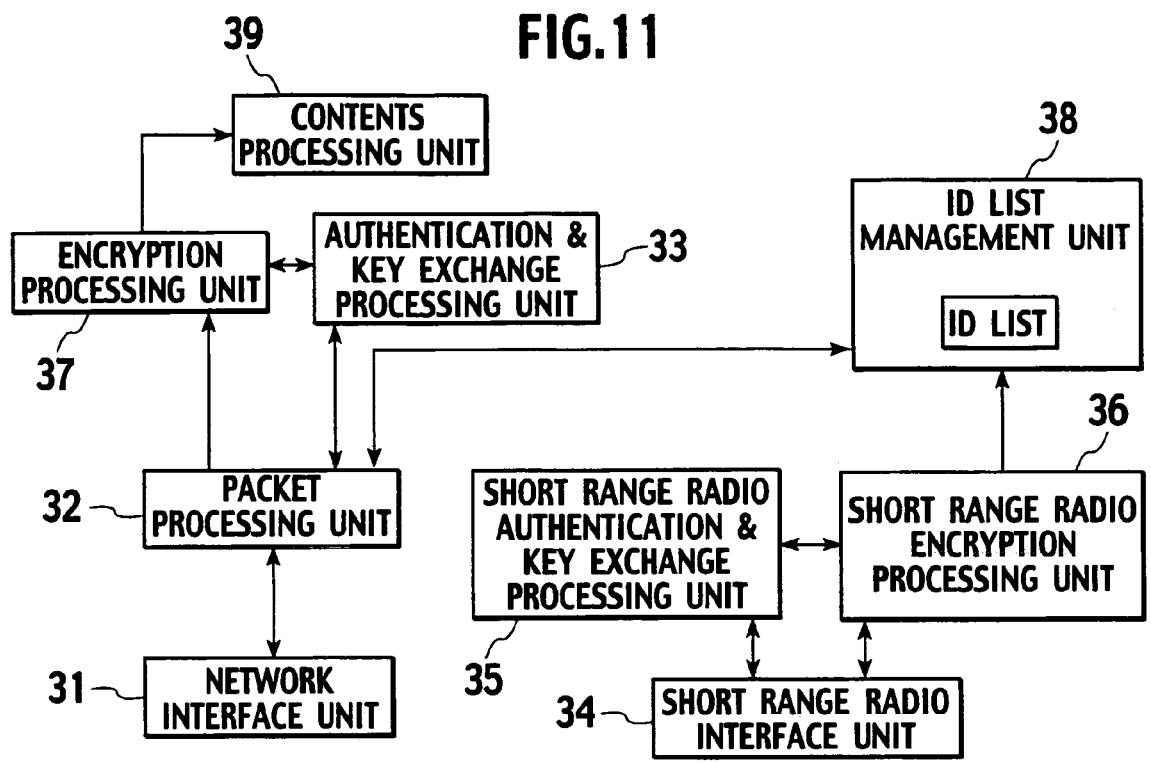

X'S HOUSE

| VERSION No. | 1 |
| --- | --- |
| AUTHENTICATION TYPE | PUBLIC KEY SCHEME |
| ID | AABBCC |
| PUBLIC KEY | XXXX |
| DEVICE TYPE | BRIDGE DEVICE |
| SIGNATURE | YYYYYYY |

FIG.28

| DEVICE ADDRESS | PUBLIC UNIQUE ID |
|---|---|
| B | ZZ |
| Y | ZZ |
| Y | YY |
| X | YY |
| X | XX |
| A | XX |
| ... | ... |

FIG.29

| ROUTE | DEVICE ADDRESS | PUBLIC UNIQUE ID |
|---|---|---|
| 1 | Y | YY |
| 2 | X | XX |
| 3 | A | XX |

FIG.30

| COMMAND DESTINATION ADDRESS = Y | COMMAND SOURCE ADDRESS = B | PUBLIC UNIQUE ID LIST ("ZZ") | FIRST RELAY HOST ADDRESS = X | SECOND RELAY HOST ADDRESS = A |
|---|---|---|---|---|

FIG.31

| COMMAND DESTINATION ADDRESS = X | COMMAND SOURCE ADDRESS = Y | PUBLIC UNIQUE ID LIST ("YY,ZZ") | SECOND RELAY HOST ADDRESS = A |
|---|---|---|---|

INFORMATION PROCESSING SCHEME FOR REALIZING CONTENTS TRANSFER AND COPYRIGHT PROTECTION

BACKGROUND OF THE INVENTION

1. Field of the Invention

The present invention relates to an information processing scheme for transferring contents of various types for which the copyright protection is necessary.

2. Description of the Related Art

In conjunction with the spread and digitalization of the computer networks in recent years, the products called digital information home electronics are becoming popular. Also in conjunction with the start of the ground digital broadcasting, the products such as digital broadcasting compatible TV, set-top box, DVD recorder, etc., are expected to become more widespread. When these digital home electronics are connected by networks, it becomes possible for the users to enjoy contents of various types through the networks, so that the utility value can be great.

Here, the contents refer to video data and speech data such as those of MPEG2, MPEG4, etc., as well as document data such as text data and still image data, etc. The contents formed by these types of digital data have an advantage that they can be copied easily without the quality degradation, but there is also need to be careful about the copyrights of the contents.

For example, consider the case of transmitting the contents that require the copyright protection from a transmission device to a reception device. It is preferable to limit a range for exchanging the contents that require the copyright protection within a prescribed range such as a range of the proper right such as a range of the private use defined by the copyright law or within a range smaller than that, such that the contents cannot be exchanged with the third person beyond that range. A method for limiting a delivery range of the contents using the registration processing is described in detail in Japanese patent application laid open No. 2002-194491, for example.

However, in the case of carrying out the AV data transmission by the IP (Internet Protocol), the problem regarding the copyright protection can arise easily because the IP can transmit data without a physical limitation such as a cable length. Namely, in the IP, the technique for logically connecting remote IP networks such as VPN (Virtual Private Network) is widely used, and by using this technique, it becomes possible to transmit the AV data by logically connecting a device connected within a home network of Mr. X's house in an A region to a device connected within a home network of Mr. Y's house in a B region (which is geographically distanced from the A region). For this reason, the contents of Mr. X's house cannot be confined within the home network inside Mr. X's house, and it becomes possible for Mr. Y at a remote place to view the contents owned by Mr. X by connecting to the home network of Mr. X.

BRIEF SUMMARY OF THE INVENTION

It is therefore an object of the present invention to provide an information processing scheme capable of realizing the effective utilization of the contents by permitting the contents transfer while protecting the copyrights.

According to one aspect of the present invention there is provided a bridge device for bridging between communication devices in an information processing system in which a range of information transfer between communication devices through a network is limited within a prescribed range by registering unique information obtainable within the prescribed range into each device and permitting information transfer between devices which share common unique information, where the unique information is formed by a pair of a public unique information and a secret unique information, the bridge device comprising: a unique information storing unit configured to store pairs of the public unique information and the secret unique information registered by the bridge device; a proxy check request receiving unit configured to receive a proxy check request, the public unique information registered by a first communication device, and an address information of a second communication device which is an intended correspondent of the first communication device, from the first communication device; a first judgement unit configured to judge whether the public unique information registered by the first communication device is registered in the unique information storing unit or not; a second judgement unit configured to judge whether any public unique information registered in the unique information storing unit is registered by the second communication device or not; a device type judgement unit configured to judge whether the second communication device is another bridge device or not, when the first judgement unit judges that the public unique information registered by the first communication device is registered in the unique information storing unit and the second judgement unit judges that one public unique information registered in the unique information storing unit is registered by the second communication device; and a unique information transmission determining unit configured to determine whether or not to transmit the secret unique information registered by the first communication device to the second communication device, according to a judgement result of the device type judgement unit.

According to another aspect of the present invention there is provided a communication device in an information processing system in which a range of information transfer between communication devices through a network is limited within a prescribed range by registering unique information obtainable within the prescribed range into each device and permitting information transfer between devices which share common unique information, where the unique information is formed by a pair of a public unique information and a secret unique information, the communication device comprising: a unique information storing unit configured to store a pair of the public unique information and the secret unique information registered by the communication device; a check unit configured to check whether the secret unique information registered in the unique information storing unit is registered by another communication device which is an intended correspondent of the communication device or not; a route search unit configured to produce a routing list indicating a route by which the another communication device can be reached from the communication device, by searching at least one bridge device for bridging between the communication device and the another communication device, when the check unit indicates that the secret unique information registered in the unique information storing unit is not registered by the another communication device; a routing list size judgement unit configured to judge whether a size of the routing list is less than or equal to a prescribed size or not; and a proxy check request transmission unit configured to transmit a proxy check request, the public unique information registered by the communication device, and an address information of the another communication device, to a first bridge device on the route when the routing list size judgement unit judges that the size of the routing list is less than or equal to the prescribed size.

According to another aspect of the present invention there is provided a method for controlling a bridge device for bridging between communication devices in an information processing system in which a range of information transfer between communication devices through a network is limited within a prescribed range by registering unique information obtainable within the prescribed range into each device and permitting information transfer between devices which share common unique information, where the unique information is formed by a pair of a public unique information and a secret unique information, the method comprising: (a) storing pairs of the public unique information and the secret unique information registered by the bridge device; (b) receiving a proxy check request, the public unique information registered by a first communication device, and an address information of a second communication device which is an intended correspondent of the first communication device, from the first communication device; (c) judging whether the public unique information registered by the first communication device is registered by the step (a) or not; (d) judging whether any public unique information registered by the step (a) is registered by the second communication device or not; (e) judging whether the second communication device is another bridge device or not, when the step (c) judges that the public unique information registered by the first communication device is registered by the step (a) and the step (d) judges that one public unique information registered by the step (a) is registered by the second communication device; and (f) determining whether or not to transmit the secret unique information registered by the first communication device to the second communication device, according to a judgement result of the step (e).

According to another aspect of the present invention there is provided a method for controlling a communication device in an information processing system in which a range of information transfer between communication devices through a network is limited within a prescribed range by registering unique information obtainable within the prescribed range into each device and permitting information transfer between devices which share common unique information, where the unique information is formed by a pair of a public unique information and a secret unique information, the method comprising: (a) storing the public unique information and the secret unique information registered by the communication device; (b) checking whether the secret unique information registered by the step (a) is registered by another communication device which is an intended correspondent of the communication device or not; (c) producing a routing list indicating a route by which the another communication device can be reached from the communication device, by searching at least one bridge device for bridging between the communication device and the another communication device, when the step (b) indicates that the secret unique information registered in the unique information storing unit is not registered by the another communication device; (d) judging whether a size of the routing list is less than or equal to a prescribed size or not; and (e) transmitting a proxy check request, the public unique information registered by the communication device, and an address information of the another communication device, to a first bridge device on the route when the step (d) judges that the size of the routing list is less than or equal to the prescribed size.

Other features and advantages of the present invention will become apparent from the following description taken in conjunction with the accompanying drawings.

BRIEF DESCRIPTION OF THE DRAWINGS

FIG. 7 is a sequence chart showing an exemplary processing procedure of an ID registration phase according to the first embodiment of the present invention.

FIG. 8 is a sequence chart showing an exemplary processing procedure of a contents transfer phase according to the first embodiment of the present invention.

FIG. 9 is a sequence chart showing another exemplary processing procedure of a contents transfer phase according to the first embodiment of the present invention.

FIG. 10 is a block diagram showing another exemplary internal configuration of a transmission device for carrying out the processing procedure of FIG. 9 according to the first embodiment of the present invention.

FIG. 11 is a block diagram showing another exemplary internal configuration of a reception device for carrying out the processing procedure of FIG. 9 according to the first embodiment of the present invention.

FIG. 12 is a diagram showing a situation in the case involving a plurality of short range radio devices.

FIG. 28 is a diagram showing an example of a public unique ID relationship table used by the reception device of FIG. 26 according to the third embodiment of the present invention.

FIG. 29 is a diagram showing an example of a routing list used by the reception device of FIG. 26 according to the third embodiment of the present invention.

FIG. 30 is a diagram showing an example of a proxy ID check request command transmitted from a reception device to one bridge device according to the third embodiment of the present invention.

FIG. 31 is a diagram showing an example of a proxy ID check request command transmitted from one bridge device to another bridge device according to the third embodiment of the present invention.

DETAILED DESCRIPTION OF THE INVENTION

Referring now to FIG. 1 to FIG. 22, the first embodiment of the present invention will be described in detail.

Figure 1:
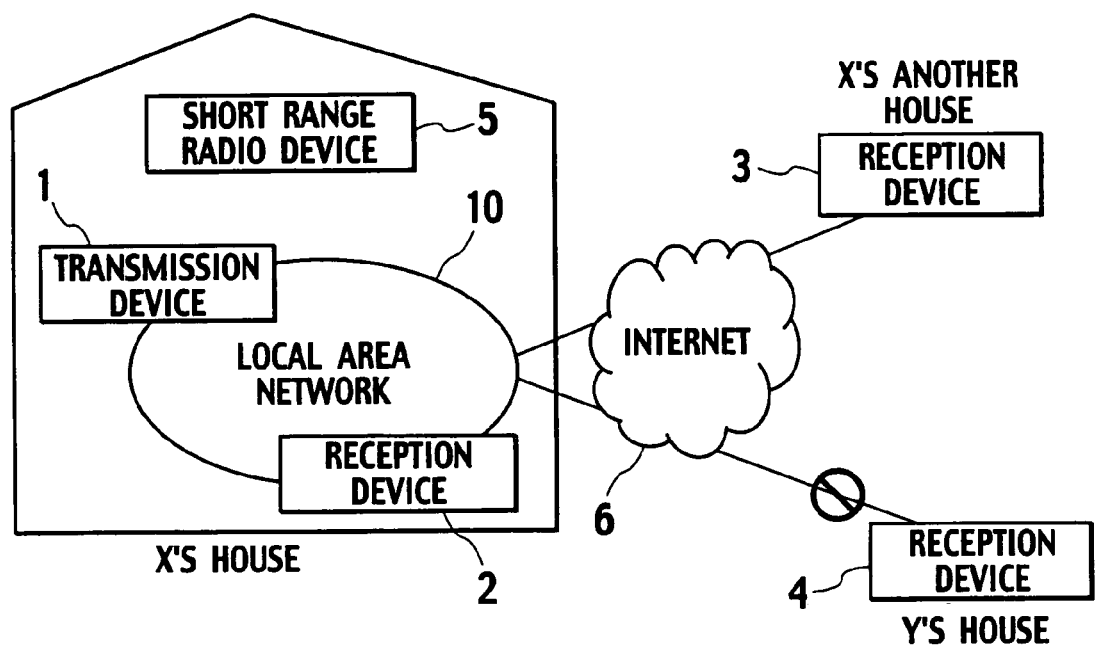
FIG. 1 is a diagram showing an exemplary schematic configuration of an information processing system according to the present invention.

FIG. 1 shows an exemplary schematic configuration of an information processing system according to the present invention. The information processing system of FIG. 1 is mainly aimed at transmission and reception of AV data within a range of the private entertainment, and has a transmission device 1 capable of transmitting contents by being connected to a local area network 10, reception devices 2, 3 and 4 capable of receiving contents, and a short range radio device 5. The short range radio device 5 is capable of communicating with the transmission device 1 and the reception device 2 by the short range radio communications, and one of its possible forms is a remote controller.

FIG. 1 shows an exemplary case where Mr. X's house contains the transmission device 1 and the reception device 2 which are connected to the local area network 10 and the short range radio device 5, Mr. X's another house contains the reception device 3, Mr. Y's house contains the reception device 4, and the local area network 10 in Mr. X's house, the reception device 3 in Mr. X's another house and the reception device 4 in Mr. Y's house are connected through the Internet 6, but the arrangement and connection form of the transmission device 1 and the reception devices 2 to 4 is not limited to those shown in FIG. 1. For example, the routers may exist on the connection routes of the local area network 10 and the reception devices 2 to 4 which are connected to the Internet 6.

For the physical layer and the link layer of the local area network 10 of FIG. 1, it is possible to adopt various forms such as a radio LAN according to the IEEE 802.11, the Ethernet (trademark), the IEEE 1394, etc. In the case of using the Internet Protocol (IP) for the network layer of the local area network 10, it can be IPv4 or IPv6. Also, devices other than the transmission device 1 and the reception device 2 may be connected to the local area network 10 but they are omitted here for the sake of simplicity.

Here, the contents to be transmitted in the information processing system of FIG. 1 refer to digital contents such as the video data such as those of MPEG2 or MPEG4, the speech data such as those of MP3, and documents of text data, image data, etc. Here, for the sake of simplicity, the case where the contents are the digital contents (which will be referred hereafter simply as contents) to be transferred after applying the copyright protection will be considered.

Here, the case of transmitting the contents from the transmission device 1 to the reception devices 2 to 4 will be considered. At this point, the care should be taken for the copyrights of the contents. As described above, it is preferable to limit a range for exchanging the contents within a prescribed range such as a range of the proper right such as a range of the private use defined by the copyright law or within a range smaller than that, and prohibit the exchange of the contents among the others, for example, beyond that range. Namely, there is a need to permit the contents transfer from the transmission device 1 to the reception devices 2 and 3 that are owned by Mr. X but prohibit the contents transfer to the reception device 4 of a different owner.

As a method for limiting the delivery range within a prescribed range, it is possible to consider a mechanism in which a procedure of "registration" is provided in advance between the transmission device 2 and the reception devices such that each device registers IDs of both devices, an ID of one of the devices, or an ID of a third device, and the contents transfer is permitted only between the registered devices. In addition, the registration possible range is set to be a physical range, and the contents transfer and the decryption of the encrypted contents are not permitted between devices that are not registered.

Figure 2:
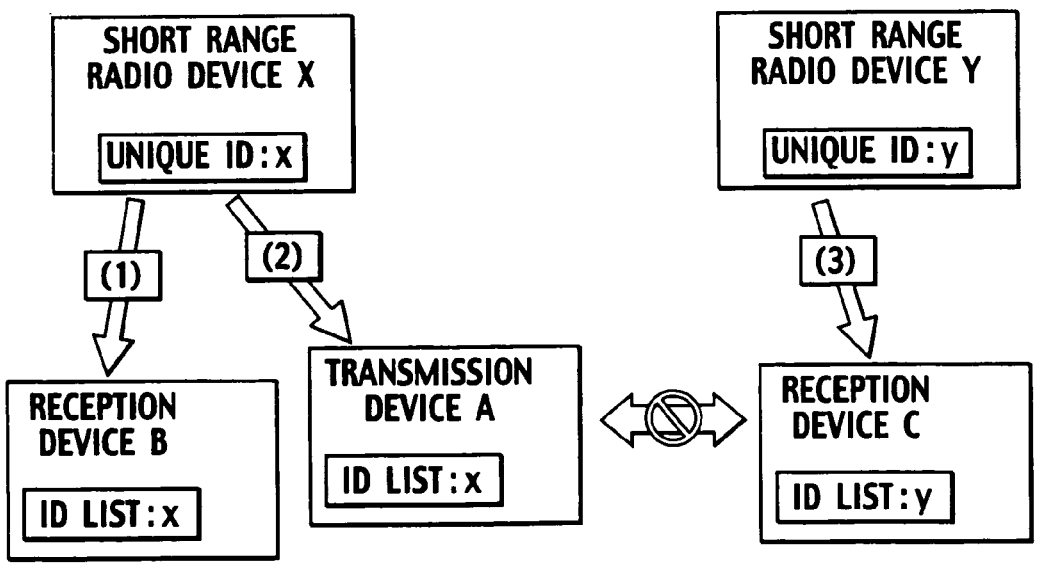
FIG. 2 is a diagram for illustrating a method for limiting the contents delivery range by the device registration according to the first embodiment of the present invention.

FIG. 2 shows a method for limiting the contents delivery range by the device registration. The short range radio device X has an ID unique to the device which cannot be rewritten (which will be referred hereafter as unique ID), and a function for transmitting this unique ID to the transmission device A and the reception device B. When the unique ID from the short range radio device X is received, the transmission device A and the reception device B register the value of the unique ID in an ID list within these devices. At a time of the contents transfer, the transmission device A and the reception device B check whether the unique ID possessed by the correspondent coincides with the unique ID in the ID list within the own device, and the contents transfer is carried out only when the unique IDs coincide.

For example, when the value of the unique ID of the short range radio device X is "x", the transmission device A and the reception device B which received this unique ID "x" from the short range radio device X mutually have the identical unique ID so that they can carry out the contents transfer, whereas the reception device C that possesses the unique ID "y" of the short range radio device Y will have the unique ID "y" in the ID list but not "x" so that the reception device C cannot receive the contents from the transmission device A.

Figure 3:
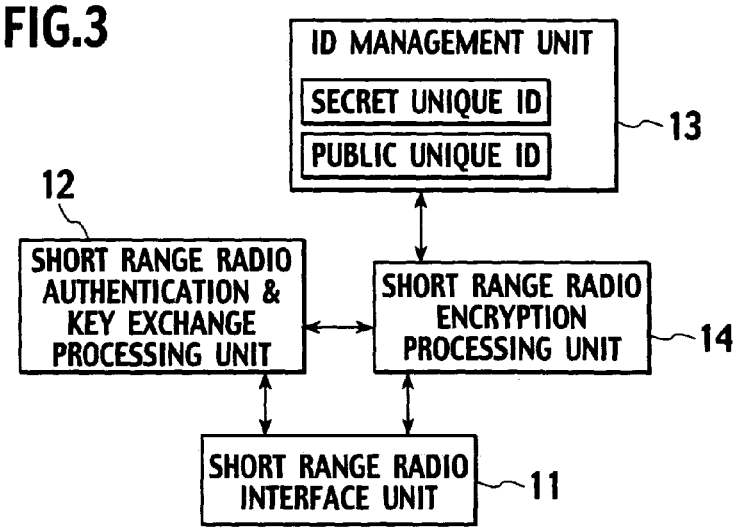
FIG. 3 is a block diagram showing an exemplary internal configuration of a short range radio device according to the first embodiment of the present invention.

FIG. 3 shows an exemplary internal configuration of the short range radio device X. The short range radio device X of FIG. 3 has a short range radio interface unit 11 for executing the physical layer processing and the datalink layer processing in order to carry out the short range radio communications with the transmission device and the reception device, a short range radio authentication and key exchange processing unit 12 for carrying out the authentication and key exchange processing with the transmission device and the reception device, an ID management unit 13, and a short range radio encryption processing unit 14.

The ID management unit 13 manages a secret unique ID and a public unique ID which are ID unique to the short range radio device X, and carries out a control for transmitting these secret unique ID and public unique ID to the transmission device A and the reception device B. The short range radio encryption processing unit 14 encrypts the secret unique ID by using a key obtained as a result of the short range radio authentication and key exchange processing.

The public unique ID is a value paired with the secret unique ID, and can be calculated from the secret unique ID by using the well known one-way hash function such as SHA1, for example. The secret unique ID and the public unique ID are values unique to the short range radio device X, and their uniqueness may be guaranteed by a license agency which issued them, or their uniqueness may be guaranteed probabilistically by using sufficiently large values such that a device vendor which manufactures the short range radio device X does not have the secret unique ID and the public unique ID with the same values. Note that the secret unique ID should preferably be such that it cannot be illegally acquired or altered from the other devices. Here, "illegally" implies a modification without consent by a third person other than a specific organization which has a right to assign IDs such as a license agency or the device vendor.

Figure 4:
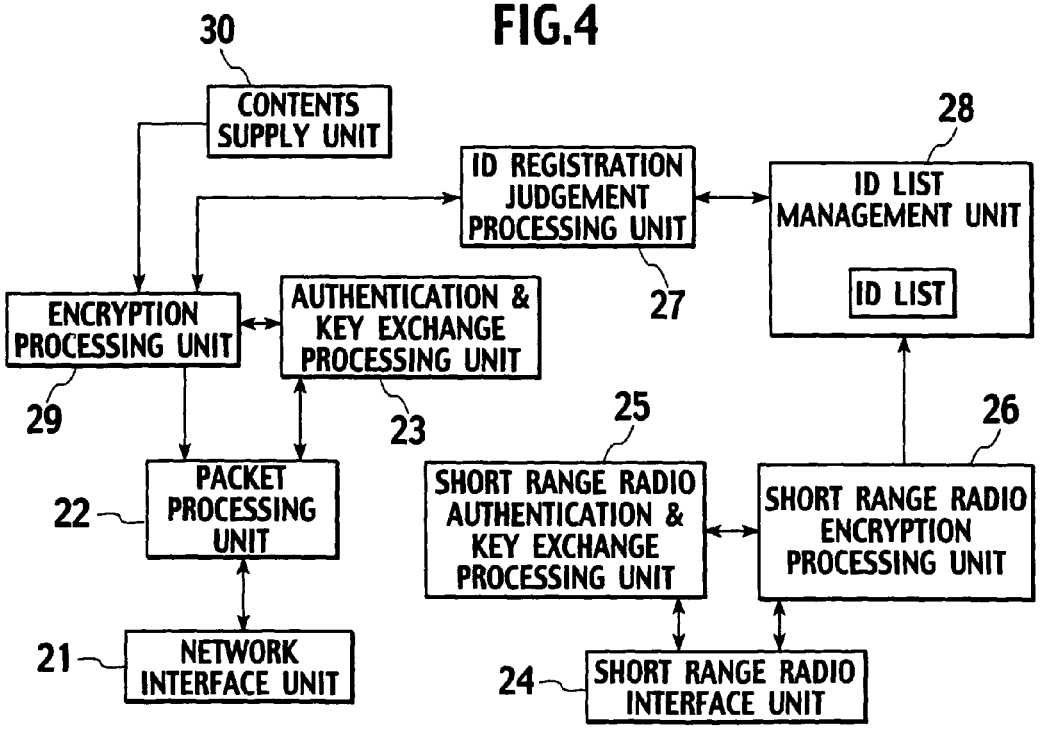
FIG. 4 is a block diagram showing an exemplary internal configuration of a transmission device according to the first embodiment of the present invention.

FIG. 4 shows an exemplary internal configuration of the transmission device A. The transmission device A of FIG. 4 has a network interface unit 21 for executing the physical layer processing and the datalink layer processing in order to carry out the communications with the reception device B, a packet processing unit 22 for executing the network layer and transport layer processing in order to carry out the transmission and reception of the contents with the reception device B, an authentication and key exchange processing unit 23 for carrying out the authentication and key exchange processing with the reception device B, a short range radio interface unit 24 for executing the physical layer processing and the datalink layer processing in order to carry out the short range radio communications with the short range radio device X, a short range radio authentication and key exchange processing unit 25 for carrying out the authentication and key exchange processing with the short range radio device X, a short range radio encryption processing unit 26 for decrypting the secret unique ID of the short range radio device X by using a key obtained as a result of the short range radio authentication and key exchange processing, an ID registration judgement processing unit 27 for judging whether or not a value in the ID list possessed by the reception device B which is entered from the network interface unit 21 is registered in the ID list of the own device, an ID list management unit 28 for registering the secret unique ID of the short range radio device X entered from the short range radio interface unit 24 into the ID list and outputting the ID list to the reception device B according to a request of the ID registration judgement processing unit 27, an encryption processing unit 29 for encrypting the contents to be transmitted, and a contents supply unit 30 for storing the contents and supplying the contents to the packet processing unit 22.

In the following example, the information to be processed at the packet processing unit 22 is assumed to be processed by using the Internet Protocol. Also, the short range radio is assumed to be the radio utilized for the infrared or radio tag (RF tag), but it is not necessarily limited to the radio.

What is important here is that the information to be processed at the network interface unit 21 is processed in the logical address space, and it is not limited to a physical range. On the other hand, the short range radio interface unit 24 limits to the information to be exchanged to a physical range as in the infrared or radio tag, or (non-radio) IC card or magnetic card.

Figures 5, 6:
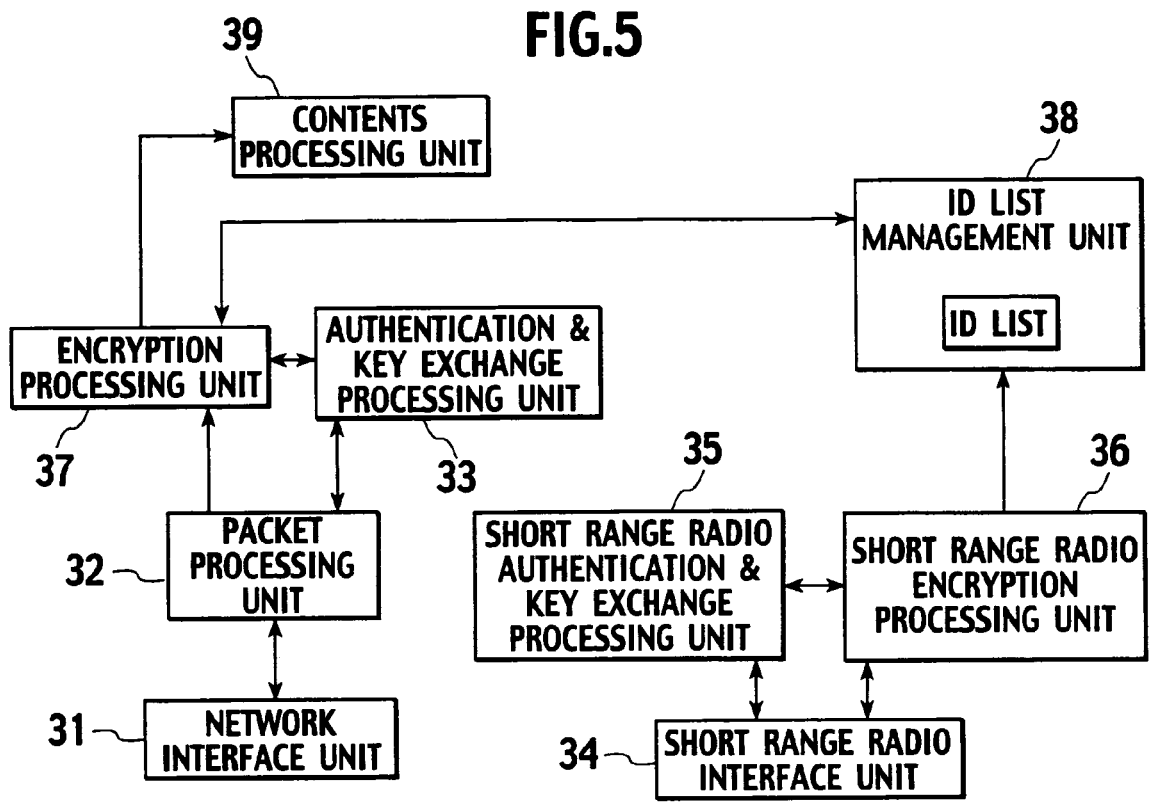
FIG. 5 is a block diagram showing an exemplary internal configuration of a reception device according to the first embodiment of the present invention.
FIG. 6 is a diagram showing an exemplary short range ID list which is stored in ID list management units of the transmission device of FIG. 4 and the reception device of FIG. 5.

FIG. 5 shows an exemplary internal configuration of the reception device B. The reception device B of FIG. 5 has the internal configuration similar to the transmission device A of FIG. 4, which differs from the transmission device A of FIG. 4 in that it has a contents processing unit 39 instead of the contents supply unit, it does not have the ID registration judgement processing unit, and an ID list management unit 38 is connected to the encryption processing unit 37 in order to encrypt the ID list and transmit it to the transmission device A.

Note that the ID management lists 28 and 38 possessed by the transmission device A and the reception device B have a function for receiving the secret unique ID from the short range radio device X and add that unique ID to the ID list, only in the case where the correspondent is authenticated as a proper device by the short range radio authentication and key exchange processing units 25 and 35.

FIG. 6 shows an exemplary short range ID list which is stored in the ID list management units 28 and 38. The ID list comprises indispensable items and optional items, and it has the secret unique ID and the public unique ID of the short range radio device X as the indispensable items, and the registration time for the registration into the ID list and a unique information generic to devices such as the MAC address and the IP address of the network interface unit of the transmission device A or the reception device B as the optional items.

Note that the ID list is assumed to be capable of recording a finite number (N sets, for example) of the secret unique IDs. Namely, the ID list management units 28 and 38 have a RAM or rewritable region for storing the ID list.

After receiving the secret unique ID from the correspondent, the ID list management units 28 and 38 add that secret unique ID to the ID list, but they do nothing at this point in the case the secret unique ID already exists in the ID list. Note that, in the case where the registration time in included in the optional items, the registration time may be updated at this point.

It is also possible to limit the number of the secret unique IDs that can be stored by the ID list management unit due to a physical limitation such as a memory capacity or a logical limitation such as license. In such a case, it is possible to make it such that, if N sets of the secret unique IDs are already recorded, the addition of the new secret unique ID is refused, or in the case where the registration time is included in the optional items, the new secret unique ID is added after the secret unique ID with the oldest registration time is deleted, or a message for urging the user to select the secret unique ID to be deleted is displayed and the selected secret unique ID is deleted.

Note that the authentication and key exchange processing here refers to the processing in which the transmission device A, the reception device B and the short range radio device X mutually authenticate that they are devices that are properly licensed from the license agency and a common key is generated when they are confirmed as the proper devices. The authentication method can be the well known method such as ISO/IEC 9798-3 or ISO/IEC 9798-2. Also, the encryption processing units 29 and 37 and the short range radio encryption processing units 14, 26 and 36 have a function for encrypting the contents, the ID list or the secret unique key by using the key shared by the authentication processing, and the encryption algorithm for encrypting or decrypting these data can be the well known method such as AES or DES.

Next, the contents transfer processing procedure to be carried out among the transmission device A, the reception device B and the short range radio device X will be described. The processing at a time of transferring the contents from the transmission device A to the reception device B is divided into two phases of "ID registration phase" and "contents transfer phase".

The "ID registration phase" is a phase for registering the unique ID of the short range radio device X into the transmission device A or the reception device B. FIG. 7 corresponds to this phase.

In the "contents transfer phase", prior to the contents transfer, the transmission device A and the reception device B check whether they mutually have the common unique ID of the short range radio device X or not, and the contents transfer is permitted when they have the same unique ID of the short range radio device X, whereas the contents transfer is refused otherwise. FIG. 8 corresponds to this phase.

As such, the "ID registration phase" is always carried out prior to the "contents transfer phase". Also, the "ID registration phase" uses the transmission device A, the reception device B and the short range radio device X, but the "contents transfer phase" uses only the transmission device A and the reception device B.

First, the processing of the ID registration phase will be described. FIG. 7 shows an exemplary processing sequence of the "ID registration phase", which shows a procedure up to the recording of the secret unique ID of the short range radio device X into the short range radio ID list.

In the following, for the sake of simplicity, the processing for registering the ID into the transmission device A will be described. First, the transmission device A transmits a secret unique ID request to the short range radio device X (step S1). According to this request, the short range radio device X and the transmission device A carry out the authentication processing to check whether they are proper devices or not, followed by the key exchange processing (step S2). In the case of the authentication failure, a prescribed error processing is carried out and the subsequent processing is omitted.

In the case of the authentication success (steps S3, S4), namely when it is confirmed that they are proper devices, the short range radio device X transmits the secret unique ID and the public unique ID to the transmission device A (step S5). At this point, it is preferable to transmit the secret unique ID by encrypting it by using the key shared by the authentication and key exchange processing so that it will not be altered on the communication path.

When the secret unique ID is received, the transmission device A adds the secret unique ID to the ID list in the transmission device A (step S6).

Note that there is no need to transmit and receive the public unique ID by encrypting it, but it is added to the ID list in pair with the secret unique ID. The case of registering the ID of the short range radio device X into the reception device B can be carried out by the similar procedure.

Note that the series of processing here is carried out by the short range radio using the short range radio interface units 11, 24 and 34 possessed by the transmission device A, the reception device B and the short range radio device X. Based on round trip time (RTT) measured between the transmission device A or the reception device B and the short range radio device X, the series of the above mentioned operations may be executed only if the measured RTT is less than a given threshold value.

By the above processing, the transmission device A and the reception device B can set the unique ID of the short range radio device X into their ID lists.

Note that FIG. 7 shows an exemplary case of transmitting the secret unique ID request from the transmission device A to the short range radio device X, but conversely, it is possible to transmit the secret unique ID request from the short range radio device X to the transmission device A to start the short range radio authentication and key exchange processing.

Also, in the case where the ID list of the transmission device A or the reception device B exceeds the number that can be recorded, it is possible to use (1) a method for deleting the secret unique ID of the short range radio device X that is registered first, and recording the newly entered secret unique ID, (2) a method for returning an error to the transmission device A or the reception device B, (3) a method for urging the user to select the secret unique ID to be deleted, and (4) a method combining these.

Next, the contents transfer phase will be described in detail. FIG. 8 shows an exemplary processing sequence of the "contents transfer phase". First, the reception device B transmits a contents receiving request to the transmission device A (step S11). According to this request, the transmission device A and the reception device B carries out the authentication and key exchange processing (step S12). When the authentication and key exchange processing is finished normally, and the key is shared between the transmission device A and the reception device B, the reception device B encrypts the ID list stored in the own device by using that shared key and transmits it (step S13).

When the ID list of the reception device B is received, the transmission device A carries out a search processing to check whether the same secret unique ID contained in the ID list of the own device is contained in the received ID list or not (step S14).

In this case, at the ID registration phase, the secret unique ID "x" of the short range radio device X is contained in the ID list of the reception device B, and the secret unique ID "x" of the short range radio device X is also contained in the ID list of the transmission device A, so that this search processing succeeds. When the search processing succeeds, a message for notifying this fact is transmitted to the reception device B (step S15), and the transmission device A starts the contents transfer (step S16).

FIG. 9 shows another exemplary processing sequence of the contents transfer phase. First, the reception device B transmits the contents receiving request by attaching only a list of the public unique IDs in the ID list to the transmission device A (step S21).

When this request and the ID list are received, the transmission device A carries out a search processing to check whether the same public unique ID contained in the ID list of the own device is contained in the received ID list or not (step S22). In this case, at the ID registration phase, the public unique ID "XX" of the short range radio device X is contained in the ID list of the reception device B, and the public unique ID "XX" of the short range radio device X is also contained in the ID list of the transmission device A, so that the value of the public unique ID "XX" matches and this search processing succeeds.

When the search processing succeeds, a message for notifying the success of the search processing and the public unique ID for which the search processing succeeded is transmitted to the reception device B (step S23).

Then, the transmission device A and the reception device B carry out the authentication and key exchange processing (step S24). At this point, the key for encrypting and decrypting the contents is generated by using the secret unique ID "x" corresponding to that public unique ID (steps S25, S26). The transmission device A encrypts the contents by using this key, and starts the transfer (step S27).

Note that, in the method of FIG. 9, the configurations of the transmission device A and the reception device B are slightly different from those used in the sequence of FIG. 8. FIG. 10 shows an exemplary internal configuration of the transmission device A corresponding to the sequence of FIG. 9, and FIG. 11 shows an exemplary internal configuration of the reception device B corresponding to the sequence of FIG. 9.

The transmission device A of FIG. 10 differs from the transmission device A of FIG. 4 in that the public ID list for registration transmitted from the reception device B is not encrypted so that the ID registration judgement processing unit 27 is connected to the packet processing unit 22 rather than the encryption processing unit 29.

The reception device B of FIG. 11 differs from the reception device B of FIG. 5 in that there is no need to encrypt the public unique ID list to be transmitted to the transmission device A so that the ID list management unit 38 is connected to the packet processing unit 32.

By carrying out the processing of FIG. 9, the encryption at a time of transmitting and receiving the ID list becomes unnecessary, and the device configurations can be simplified. The ID check processing is carried out prior to the authentication and key exchange, so that if the devices for which the IDs do not match attempt the connection, it becomes an error by the ID check processing, and it is possible to avoid the unnecessary authentication and key exchange processing.

If it is the transmission device A or the reception device B which carried out the processing of the ID registration phase with the short range radio device X in the proper procedure, it should possess the same pair of the public unique ID "XX" and the secret unique ID "x". Consequently, even though the public unique ID is transmitted and received in a plaintext, even if a malicious third person alters the public unique ID on the communication path in an attempt to detour this ID check processing, the same key cannot be generated between the devices which do not share the secret unique ID so that the contents cannot be encrypted or decrypted correctly.

Note that the series of processing in the contents transfer phase is carried out by the same interfaces used for the contents transmission and reception.

By the above procedure, at the contents transfer phase, the contents transfer can be carried out only by the transmission device A and the reception device B that are registered at the same short range radio device X.

In the above example, the processing in which the reception device B transmits the ID list and the transmission device A compares the ID list in the own device and the ID list received from the reception device B has been described, but it is also possible to use the reverse configuration in which the reception device B compares the ID lists. In such a case, the ID registration judgement processing unit is provided in the reception device B rather than the transmission device A. Of course, it is also possible to provide the ID registration judgement processing unit in both the transmission device A and the reception device B.

In the above example, the case of registering the ID into the transmission device and the reception device by using one short range radio device X has been described. However, there can be cases where a plurality of short range radio devices exist in the house. In such a case, a plurality of device groups which are registered by different short range radio devices may exist such that the communications cannot be carried out between the different device groups.

FIG. 12 shows a situation in the case of registering the ID in the transmission device and the reception device by using a plurality of short range radio devices. In FIG. 12, the ID "x" is registered into the transmission device A and the reception device B by the short range radio device X, and the ID "y" is registered into the reception device C and the transmission device D by the short range radio device Y. The transmission device A and the reception device B have the ID of the identical short range radio device X so that the transmission and reception of the contents are possible between them. Similarly, the transmission and reception of the contents are possible between the reception device C and the transmission device D. However, the transmission device A and the reception device C have different IDs registered so that the transmission and reception of the contents are not possible between them. Similarly, the transmission and reception of the contents are not possible between the reception device B and the transmission device D.

In order to resolve this problem, there is a method for enabling communications through an authentication bridge device, between the transmission device A and the reception device C which do not share the identical secret unique ID directly.

Figure 13:
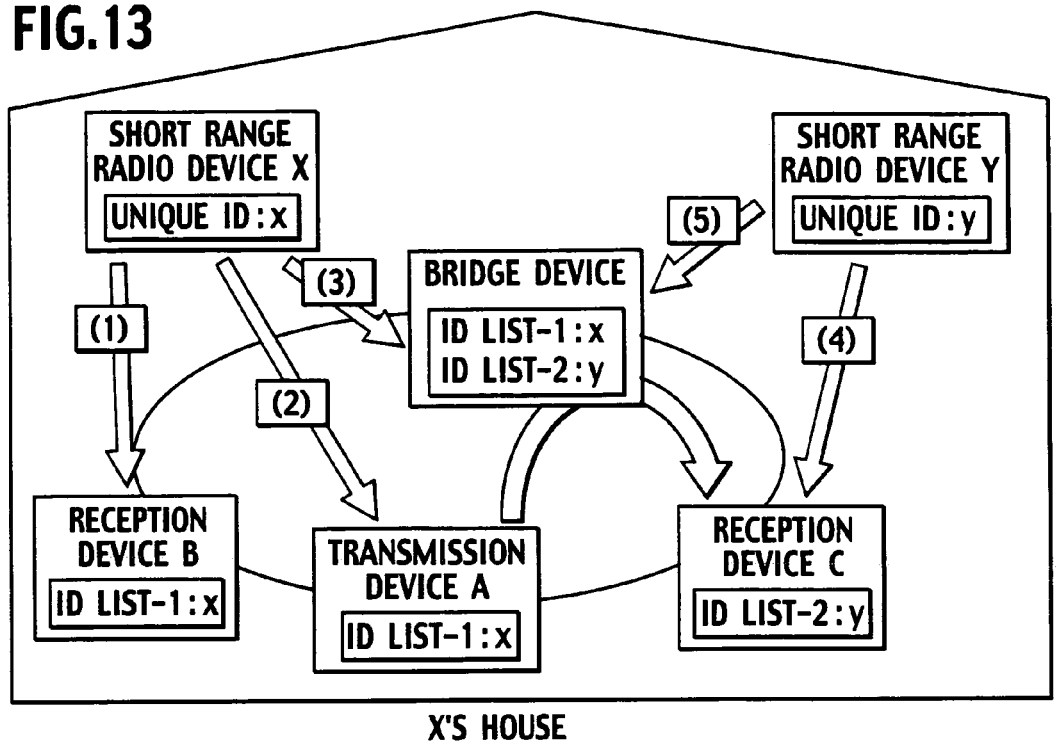
FIG. 13 is a diagram for illustrating a method for limiting the contents delivery range by using a bridge device according to the first embodiment of the present invention.

FIG. 13 shows a method for limiting the contents delivery range by using a bridge device. FIG. 13 shows a state in which the ID of the short range radio device X is registered in the transmission device A, the reception device B and the bridge device, while the ID of the short range radio device Y is registered in the reception device C, the transmission device D (not shown) and the bridge device. Namely, in the ID list of the bridge device, the IDs of both the short range radio device X and the short range radio device Y are registered. The transmission device A can carry out the communications with the reception device C and the transmission device D (not shown) through this bridge device.

However, if the bridging is permitted unlimitedly, there can be cases where a plurality of users intentionally share the bridge device and the bridge devices are connected in multiple stages through the Internet such that the contents delivery can be carried out unlimitedly. For this reason, in this embodiment, the unlimited bridging is avoided by limiting the connection between the bridge devices.

Figure 14:
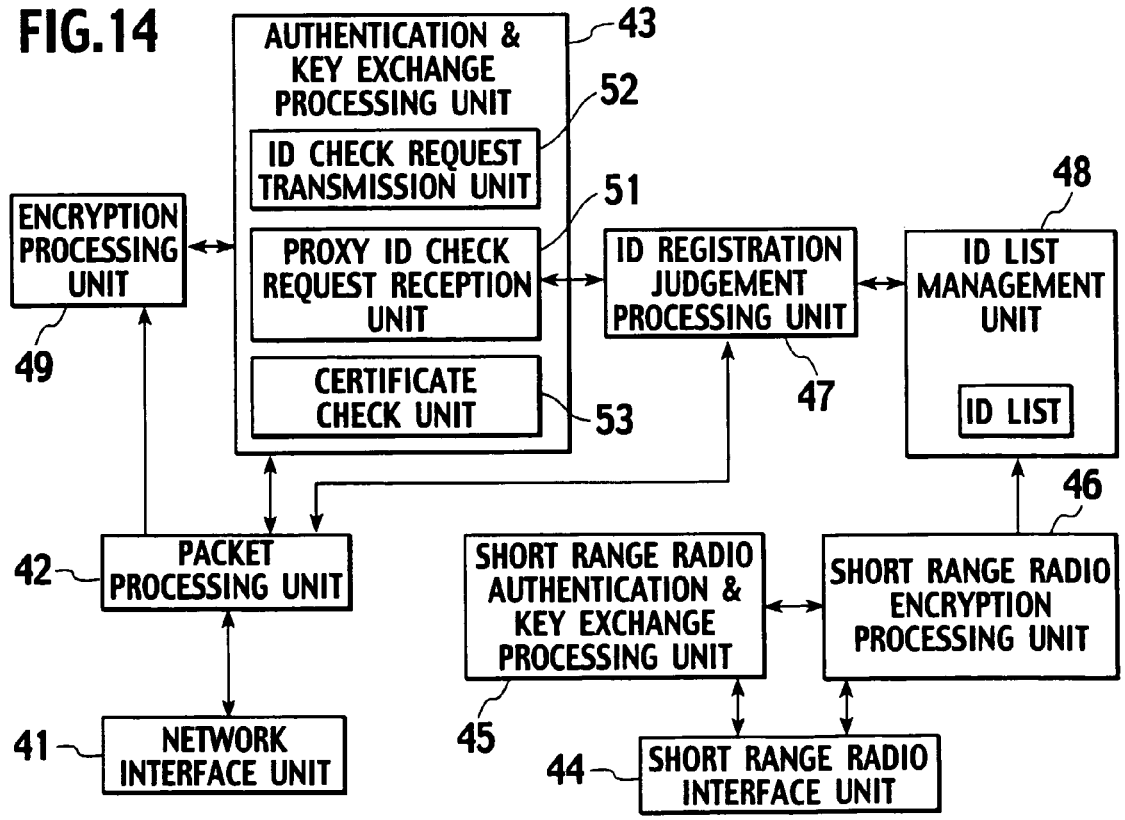
FIG. 14 is a block diagram showing an exemplary internal configuration of a bridge device according to the first embodiment of the present invention.

FIG. 14 shows an exemplary internal configuration of the bridge device in this embodiment. The bridge device of FIG. 14 has a network interface unit 41 for executing the physical layer processing and the datalink layer processing in order to carry out the communications with the transmission device A and the reception device B, a packet processing unit 42 for executing the network layer and transport layer processing in order to carry out the transmission and reception of the information for the authentication and key exchange with the transmission device A and the reception device B, an authentication and key exchange processing unit 43 for carrying out the authentication and key exchange processing with the transmission device A and the reception device B, a short range radio interface unit 44 for executing the physical layer processing and the datalink layer processing in order to carry out the short range radio communications with the short range radio device X, a short range radio authentication and key exchange processing unit 45 for carrying out the authentication and key exchange processing with the short range radio device X, a short range radio encryption processing unit 46 for decrypting the secret unique ID of the short range radio device X by using a key obtained as a result of the short range radio authentication and key exchange processing, an ID registration judgement processing unit 47 for judging whether or not a value in the ID list possessed by the transmission device A or the reception device B which is entered from the network interface unit 41 is registered in the ID list of the own device, an ID list management unit 48 for registering the secret unique ID of the short range radio device X entered from the short range radio interface unit 44 into the ID list and outputting the ID list to the transmission device A or the reception device B according to a request of the ID registration judgement processing unit 47, an encryption processing unit 49.

The authentication and key exchange processing unit 43 has a proxy ID check request reception unit 51 for receiving a proxy ID check request from the reception device B and notifies this fact to the ID list management unit 48, an ID check request transmission unit 52 for transmitting the ID check request to the transmission device A, and a certificate check unit 53 for judging whether the correspondent is a bridge device or not by checking the certificate of the correspondent.

Each of the transmission device, the reception device and the bridge device possesses a certificate for proving that it is a device which is properly licensed by some specific license agency, in the own device. This certificate is provided inside the authentication and key exchange processing unit, for example.

Figures 15, 16:
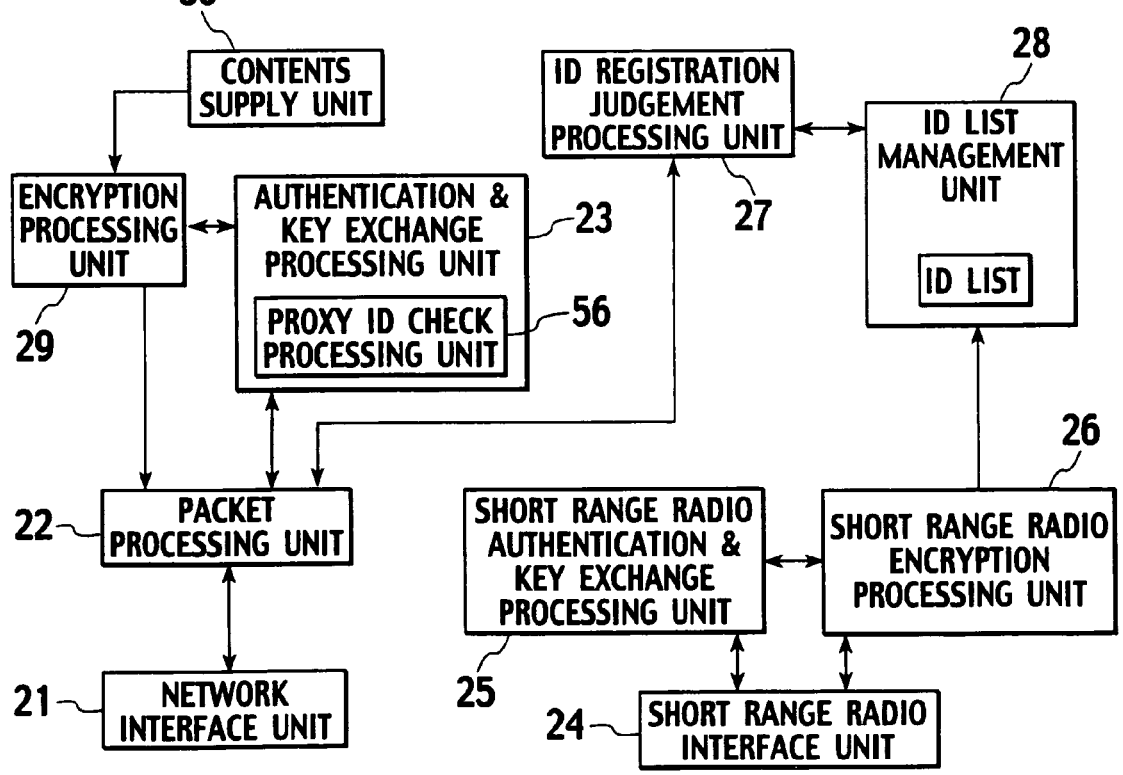
FIG. 15 is a diagram showing an exemplary format of a certificate according to the first embodiment of the present invention.
FIG. 16 is a block diagram showing another exemplary internal configuration of a transmission device to be used with the bridge device of FIG. 14 according to the first embodiment of the present invention.

FIG. 15 shows an exemplary format of the certificate. The certificate contains a version number, an authentication type for indicating a type of the authentication scheme, an ID uniquely assigned to each device by the license agency, a public key to be used in the authentication and key exchange, a device type for identifying a type of the device, and a signature given by the license agency in order to prove that the above information is not altered. What is important here is the device type. This device type is for distinguishing the case where the device that possesses the certificate is the transmission device A or the reception device B, and the case where it is the bridge device. FIG. 15 shows an example of the certificate for the bridge device, so that the device type is "bridge device".

FIG. 16 shows an exemplary internal configuration of the transmission device A for carrying out communications with the bridge device of FIG. 14. The transmission device A of FIG. 16 differs from that of FIG. 10 in the configuration of the authentication and key exchange processing unit, which has a proxy ID check processing unit 56 for receiving the ID check request from the bridge device and carrying out a prescribed operation.

Figure 17:
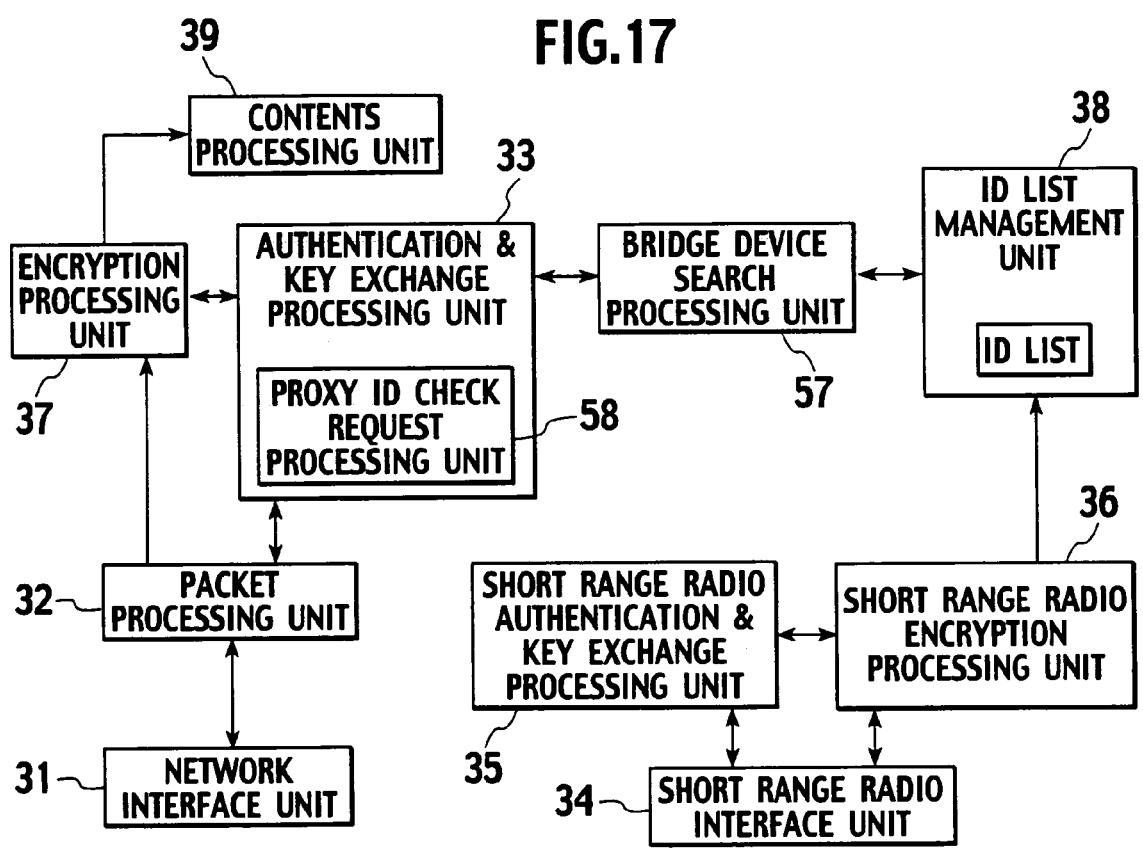
FIG. 17 is a block diagram showing another exemplary internal configuration of a reception device to be used with the bridge device of FIG. 14 according to the first embodiment of the present invention.

FIG. 17 shows an exemplary internal configuration of the reception device B for carrying out communications with the bridge device of FIG. 14. The reception device B of FIG. 17 has, in addition to the configuration of the reception device B of FIG. 11, a bridge device search processing unit 56 for searching the bridge device registered by the same short range radio device X in the case where the ID check processing with the transmission device A fails in the contents transfer phase. Also, the authentication and key exchange processing unit 33 has a proxy ID check request processing unit 58 for transmitting the ID check request to the bridge device.

Next, the contents transfer phase in this embodiment will be described. Here, the exemplary case of using the transmission device A, the bridge device and the reception device C of FIG. 13 will be described. At the transmission device A, it is assumed that the ID registration processing has succeeded by the short range radio device X and the secret unique ID "x" of the short range radio device X is already registered in the ID list. At the reception device C, it is assumed that the ID registration processing has succeeded by the short range radio device Y and the secret unique ID "y" of the short range radio device Y is already registered in the ID list.

On the other hand, at the bridge device, it is assumed that the ID registration processing has been carried out with both the short range radio devices X and Y and both of the secret unique IDs "x" and "y" are already registered in the ID list in the own device. Here, the case of transmitting the contents from the transmission device A to the reception device C in this state will be considered.

Figure 18:
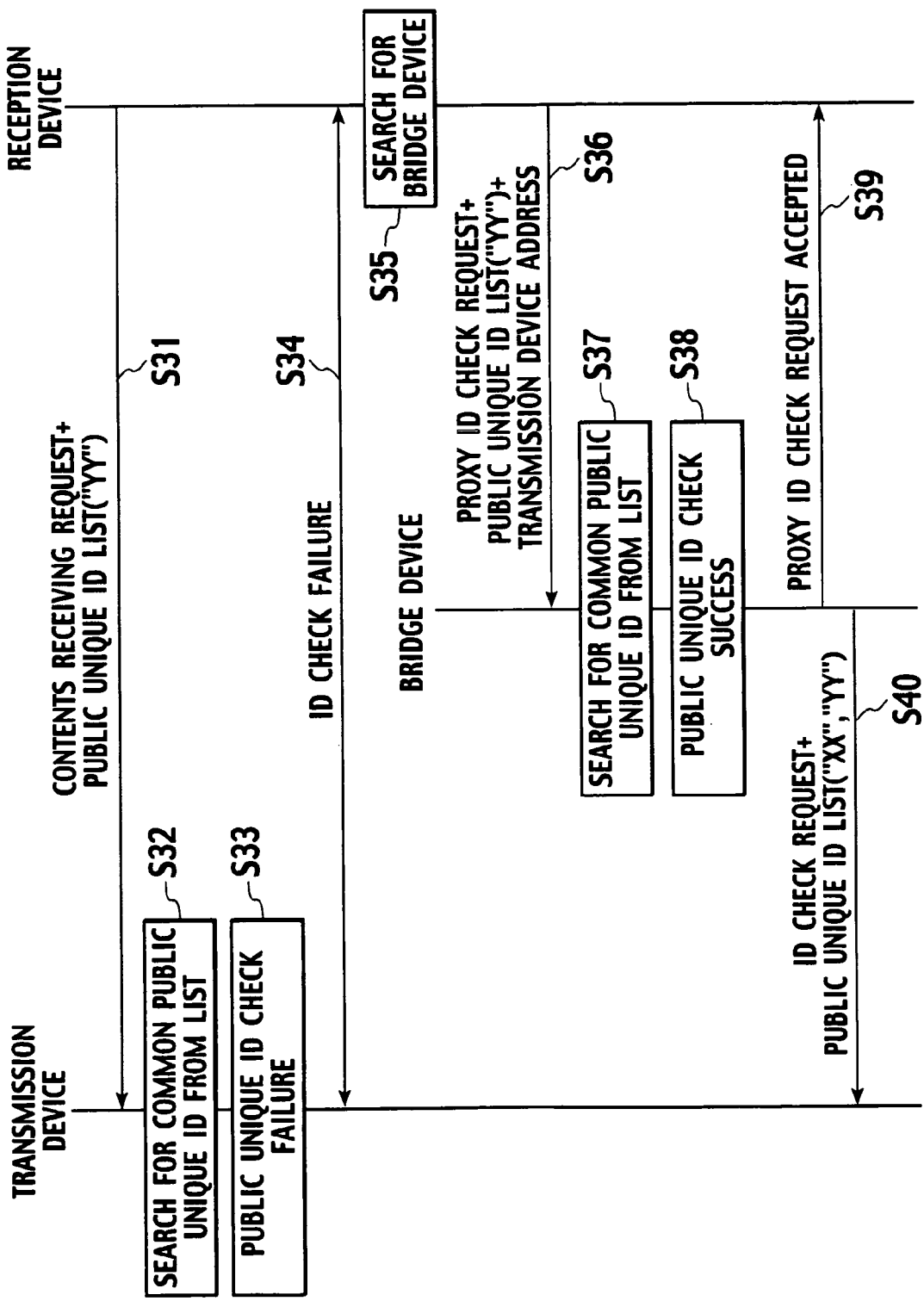
FIG. 18 and FIG. 19 are a sequence chart showing an exemplary processing procedure of a contents transfer phase in the case of using the bridge device of FIG. 14 according to the first embodiment of the present invention.
Figure 19:
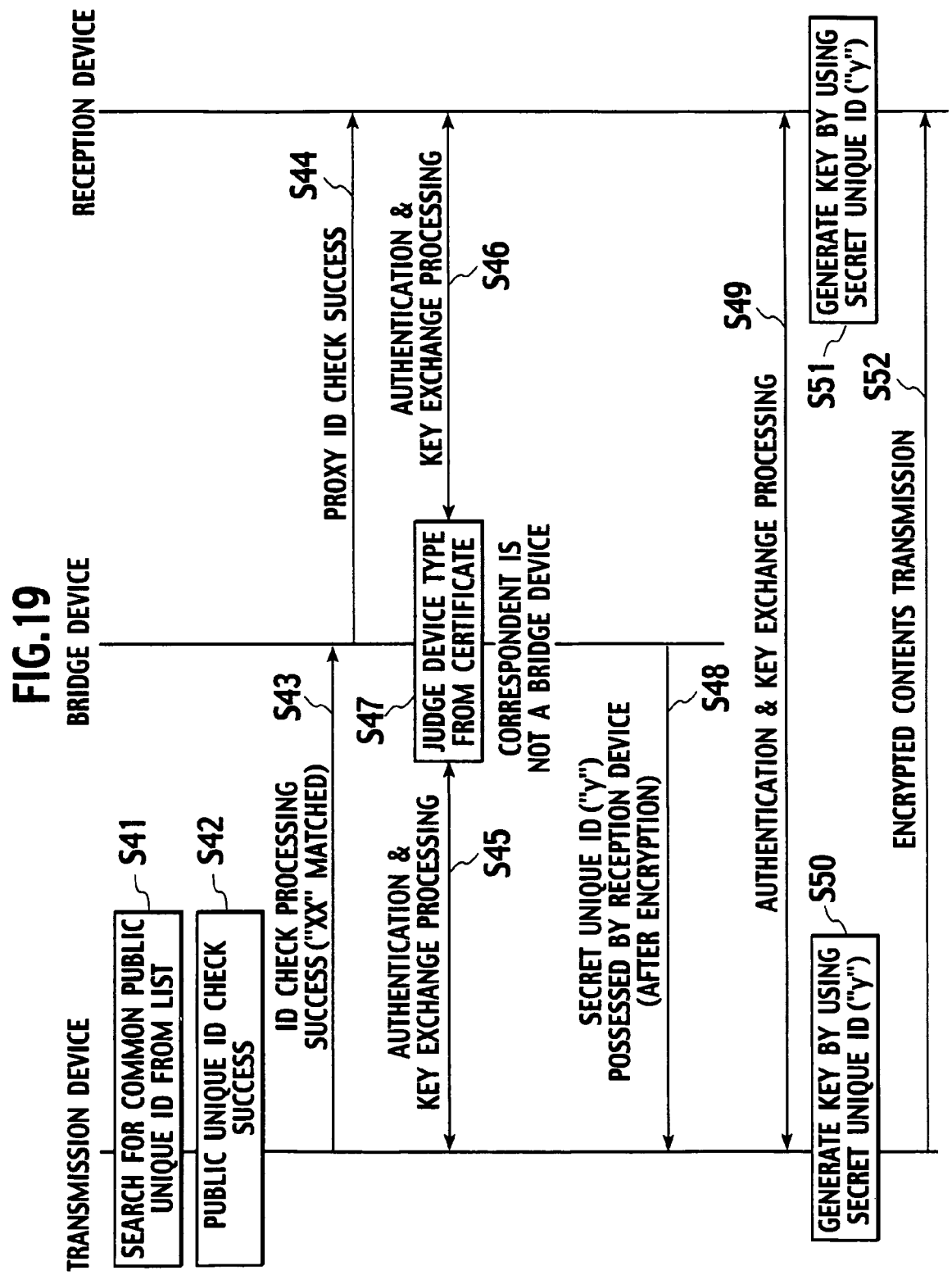

FIG. 18 and FIG. 19 show an exemplary processing sequence of the contents transfer phase in this embodiment. First, the reception device C transmits the contents receiving request and the public unique ID list of the own device to the transmission device A (step S31). According to the contents receiving request received from the reception device C, the transmission device A compares the ID list of the own device with the ID list received from the reception device C and searches for the coinciding public unique ID (step S32). In this case, the transmission device A and the reception device C have not carried out the processing of the ID registration phase with the same short range radio device, so that they do not have the common public unique ID and this processing fails (steps S33, S34).

Next, the reception device C searches for the bridge device that has the same secret unique ID in the ID list as the secret unique ID contained in the ID list of the transmission device A (step S35). If the search succeeds, the reception device C transmits the proxy ID check request for requesting the proxy ID check processing, the ID list of the own device, and the address of the transmission device A which is the correspondent for the contents transfer, to the bridge device (step S36).

When these messages are received, the bridge device compares the ID list of the own device with the ID list received from the reception device C and searches for the coinciding public unique ID (step S37). In this case, the reception device C and the bridge device have carried out the processing of the ID registration phase with the same short range radio device Y, so that the public unique ID "YY" is contained in the ID list and this search processing succeeds (step S38).

The bridge device notifies the fact that the proxy ID check request is accepted to the reception device C (step S39), and transmits the ID check request and the ID list of the bridge device in order to notify the transmission device A that the proxy ID check request will be made to the transmission device A (step S40).

When the ID list from the bridge device is received, the transmission device A compares the ID list of the own device with the received ID list and searches for the coinciding public unique ID (step S41). In this case, the transmission device A and the bridge device have carried out the processing of the ID registration phase with the same short range radio device X, so that the public unique ID "XX" is contained in the ID list and this search processing succeeds (step S42). The transmission device A transmits a message for notifying that the proxy ID check has succeeded to the bridge device (step S43), and the bridge device transmits a message for notifying that the proxy ID check has succeeded to the reception device C (step S44).

Next, the authentication and key exchange processing is carried out between the bridge device and the transmission device A, and between the bridge device and the reception device C (steps S45, S46).

At this point, the bridge device checks the device type field of the certificate received from each device (step S47). If the device type is the transmission device A or the reception device C, the processing is continued. If the device type is the bridge device, the processing is interrupted. In this way, it is possible to prevent the authentication and key exchange processing between the bridge devices.

In this example, the targets of the authentication and key exchange processing by the bridge device are the transmission device A and the reception device C, so that the authentication and key exchange processing succeeds, and the bridge device transmits the secret unique ID "y" shared with the reception device C to the transmission device A by encrypting it by using the key generated by the authentication and key exchange carried out with the transmission device A (step S48). In this way, the transmission device A and the reception device C temporarily share the common secret unique ID "y".

Then, the transmission device A and the reception device C carry out the authentication processing (step S49), generate the key for encrypting and decrypting the contents by using the secret unique ID "y" (steps S50, S51), and start the transmission and reception of the contents (step S52).

Note that FIG. 18 and FIG. 19 show the exemplary processing procedure in which the reception device C and the transmission device A carries out the ID check once and after this fails the reception device C searches for the bridge device, but in the case where the reception device C knows in advance that it does not share the ID with the transmission device A, there is no need to carry out this ID check processing, and the processing may be started from the bridge device search processing.

Figure 20:
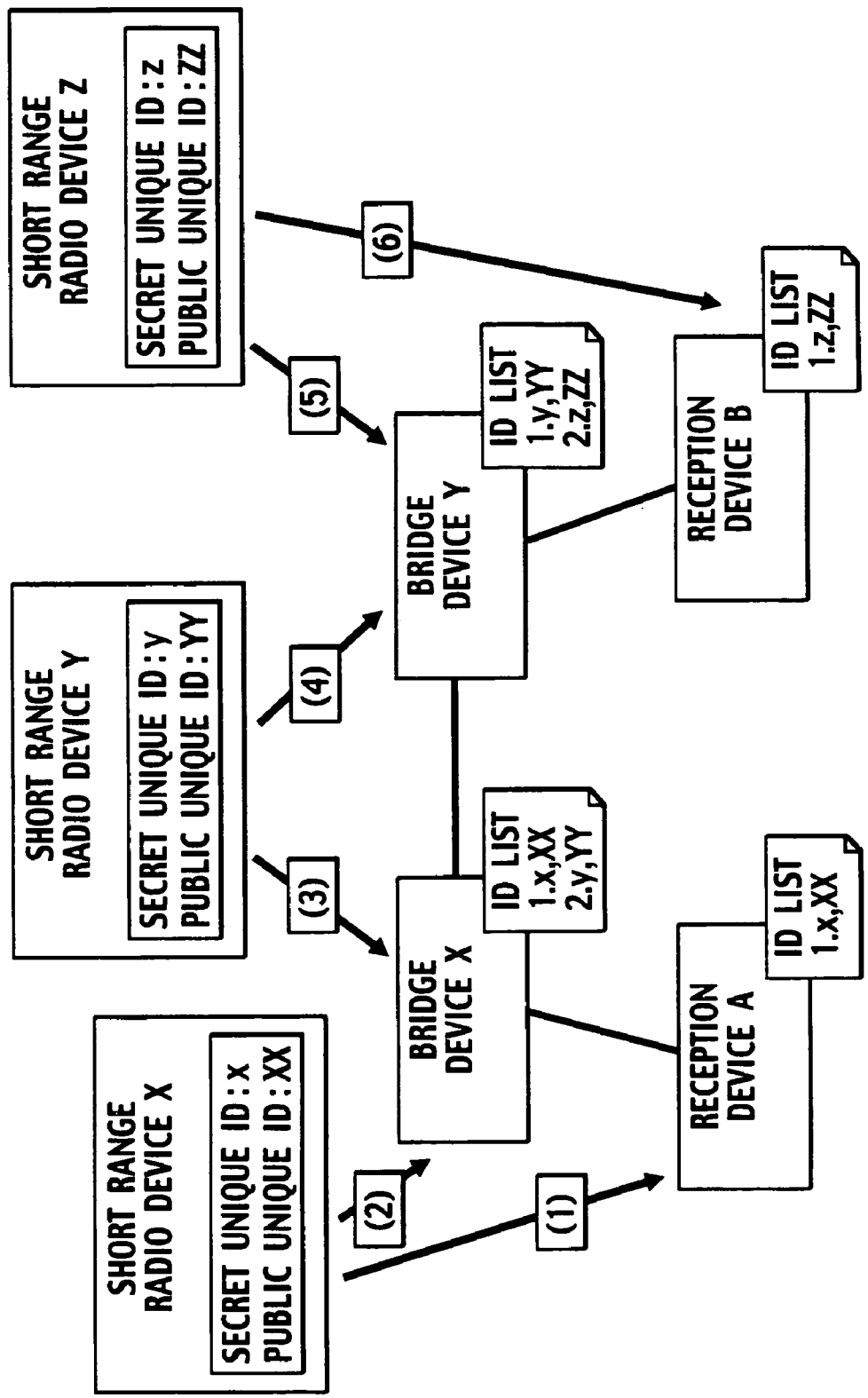
FIG. 20 is a diagram showing a situation in the case where two bridge devices are arranged between a transmission device and a reception device.

FIG. 20 shows a situation in the case where two bridge devices X and Y are arranged between the transmission device A and the reception device B. In FIG. 20, the transmission device A and the bridge device X are registered by using the short range radio device X, the bridge device X and the bridge device Y are registered by using the short range radio device Y, and the bridge device Y and the reception device B are registered by using the short range radio device Z.

Namely, it is a state in which the bridge device X registers the secret unique ID "x" of the short range radio device X and the secret unique ID "y" of the short range radio device Y in the ID list, and the bridge device Y registers the secret unique ID "y" of the short range radio device Y and the secret unique ID "z" of the short range radio device Z in the ID list. Here, the case of transmitting the contents from the transmission device A to the reception device B via the bridge device X and the bridge device Y will be considered.

Figure 21:
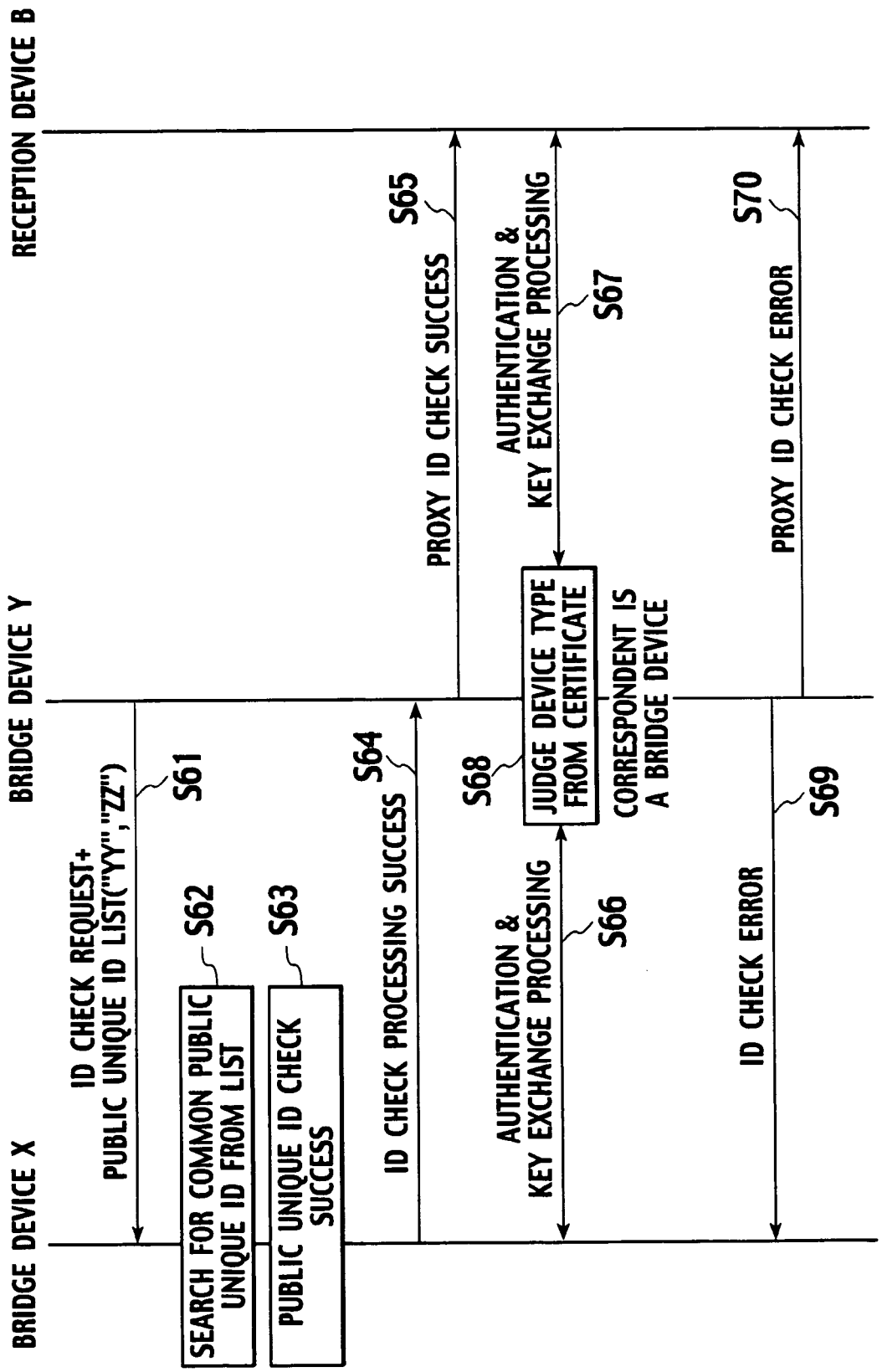
FIG. 21 is a sequence chart showing an exemplary processing procedure of a contents transfer phase in the case of FIG. 20 according to the first embodiment of the present invention.

FIG. 21 shows an exemplary processing sequence of the contents transfer phase in the case of arranging two bridge devices X and Y. The first half of the processing is the same as in the processing of FIG. 18 so that its description will be omitted here, and the processing from a point where the bridge device Y transmits the ID list will be described. The bridge device Y transmits the ID check request and the ID list of the own device to the bridge device X, according to the proxy ID check request of the reception device B (step S61). The bridge device X compares the ID list of the own device with the ID list received from the bridge device Y and searches for the coinciding public unique ID (step S62). In this case, the secret unique ID "y" is a common value so that this ID check processing succeeds, and the bridge device X transmits a message for notifying that the ID check succeeded to the bridge device Y (step S64), and the bridge device Y transmits a message for notifying that the proxy ID check succeeded to the reception device B (step S65).

Then, the bridge device X and the bridge device Y start the authentication and key exchange processing (steps S66, S67), but the device type fields of the certificates possessed by the bridge devices X and Y indicate the bridge device so that the processing is interrupted (step S68), and the bridge device Y transmits an error message to the bridge device X and the reception device B (steps S69, S70).

Also, in this example, the case where the bridge device Y which has the same value as the secret unique ID registered at the reception device B judges the device type of the certificate, but it is also possible to use (a) a method in which the bridge device X carries out the judging processing and returns a result to the bridge device Y, (b) a method in which both of the bridge devices X and Y carry out the judging processing, etc.

By the above procedure, it becomes possible to avoid the authentication and key exchange processing between the bridge devices at the contents transfer phase, and it becomes possible to avoid the transmission and reception of the contents over two or more bridge devices at a time of carrying out communications between the transmission device A and the reception device B.

Note that, at a time of carrying out the above communications, the transmission and reception can be realized by using the packets of the network layer such as the IP (Internet Protocol), or the frames of the datalink layer. In addition, in the case of using the IP, the address information transmitted from the reception device C to the bridge device may be an IP address.

In FIG. 18 and FIG. 19, the authentication and key exchange processing is carried out between the transmission device A and the bridge device, between the bridge device and the reception device C, and between the transmission device A and the reception device C, and here it is also possible for the transmission device A to transmit messages of the authentication and key exchange processing by setting a value of the TTL in the IP header to be less than or equal to a certain number, in order to confirm that the section between the devices which carry out the authentication and key exchange is existing within a prescribed rage logically and physically. It is also possible to measure the round trip time between the transmission device A and the reception device C and interrupt the authentication and key exchange processing in the case where the round trip time exceeds a certain amount of time.

Note that, in this example, the processing procedure in which the contents transmission request or the proxy ID check request are transmitted from the reception device C has been described, but this embodiment is not limited to the case, and it is also possible to use the processing procedure in which these requests are transmitted from the transmission device A to the reception device C.

Also, in this example, the key for encrypting and decrypting the contents is generated by using the value of the secret unique ID which is a secret value, but the point of this embodiment is whether or not the reception device C can receive the correctly decrypted contents from the transmission device A, so that it is also possible to carry out the second authentication and key exchange processing different from the authentication and key exchange processing described above, such that whether the secret unique ID is shared or not is checked by the second authentication and key exchange and key for encrypting and decrypting the contents is generated by using a value shared by the second authentication and key exchange.

The first embodiment described above is particularly effective in the case where the home server exists. For example, in the case where the short range radio device is incorporated as a part of the infrared remote controllers which have a function for controlling the transmission device or the reception device, it is customary to sell such a remote controller as an accessory of each device. In such a case, as many short range radio devices as the number of transmission and reception devices will exist in the house, and the appropriate grouping cannot be made unless the user remembers which device is registered by using which short range radio device. However, if the use of the home server is assumed, when a new device is arranged in the house, the new device and the home server are registered by using the short range radio device associated with that new device. In this way, it is possible to regard the home server as the bridge device which bridges between the new device and the existing device.

Figure 22:
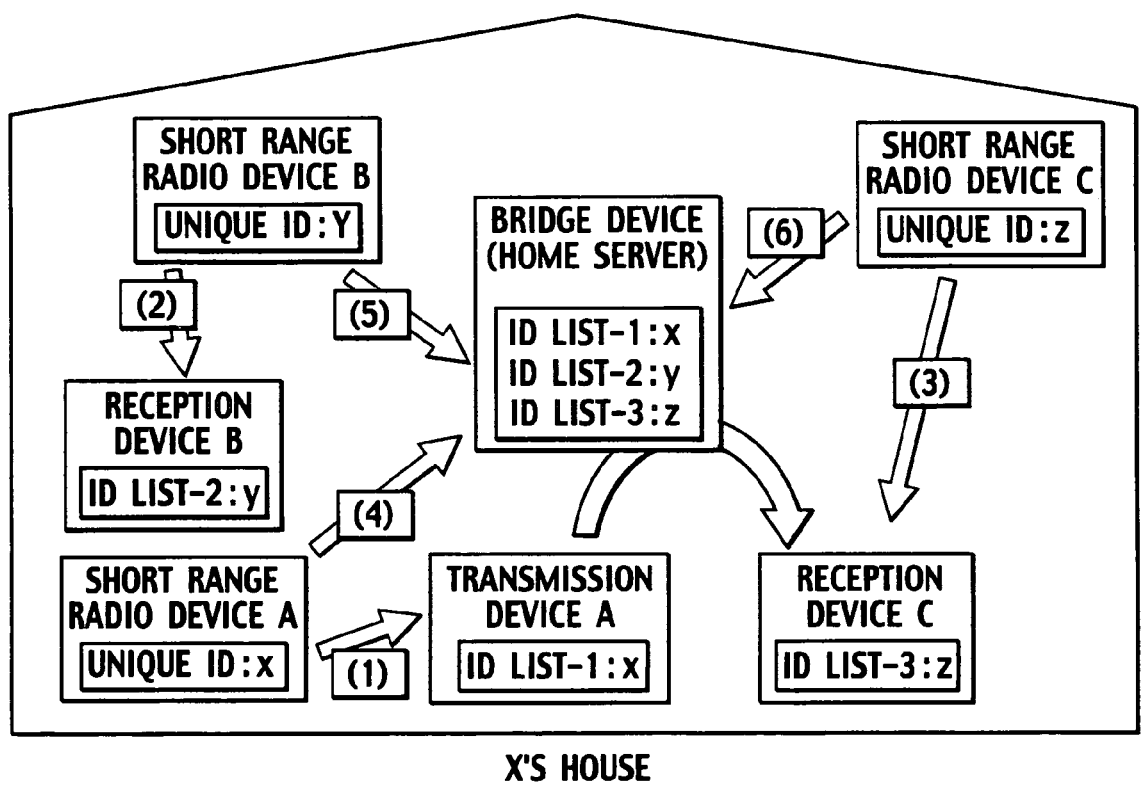
FIG. 22 is a diagram showing an exemplary schematic configuration of an information processing system in which a bridge device functions as a home server according to the first embodiment of the present invention.

FIG. 22 shows a schematic configuration of the information processing system in the case where the bridge device functions as the home server. Each device of FIG. 22 is registered by using the short range radio device associated with each device. For example, the registration processing for the transmission device A is carried out by using the short range radio device A. Note that this registration processing may be carried out by the product vendor in advance, before the shipment of the product. At a time of connecting the reception device B for which the secret unique ID is registered by the short range radio device B, to the home network, it becomes possible for the device user to make the reception device B possible to communicate with the transmission device A by Just registering the bridge device by using the short range radio device B. In this way, the burden of the registration to be made by the user can be reduced.

As described, in the first embodiment, the device type is checked according to the certificate possessed by each device, and the authentication and key exchange processing is carried out only when it is not the bridge device, so that it becomes possible to permit the contents transfer only within a limited range, and the contents transfer becomes possible while protecting the copyrights of the contents.

Figure 23:
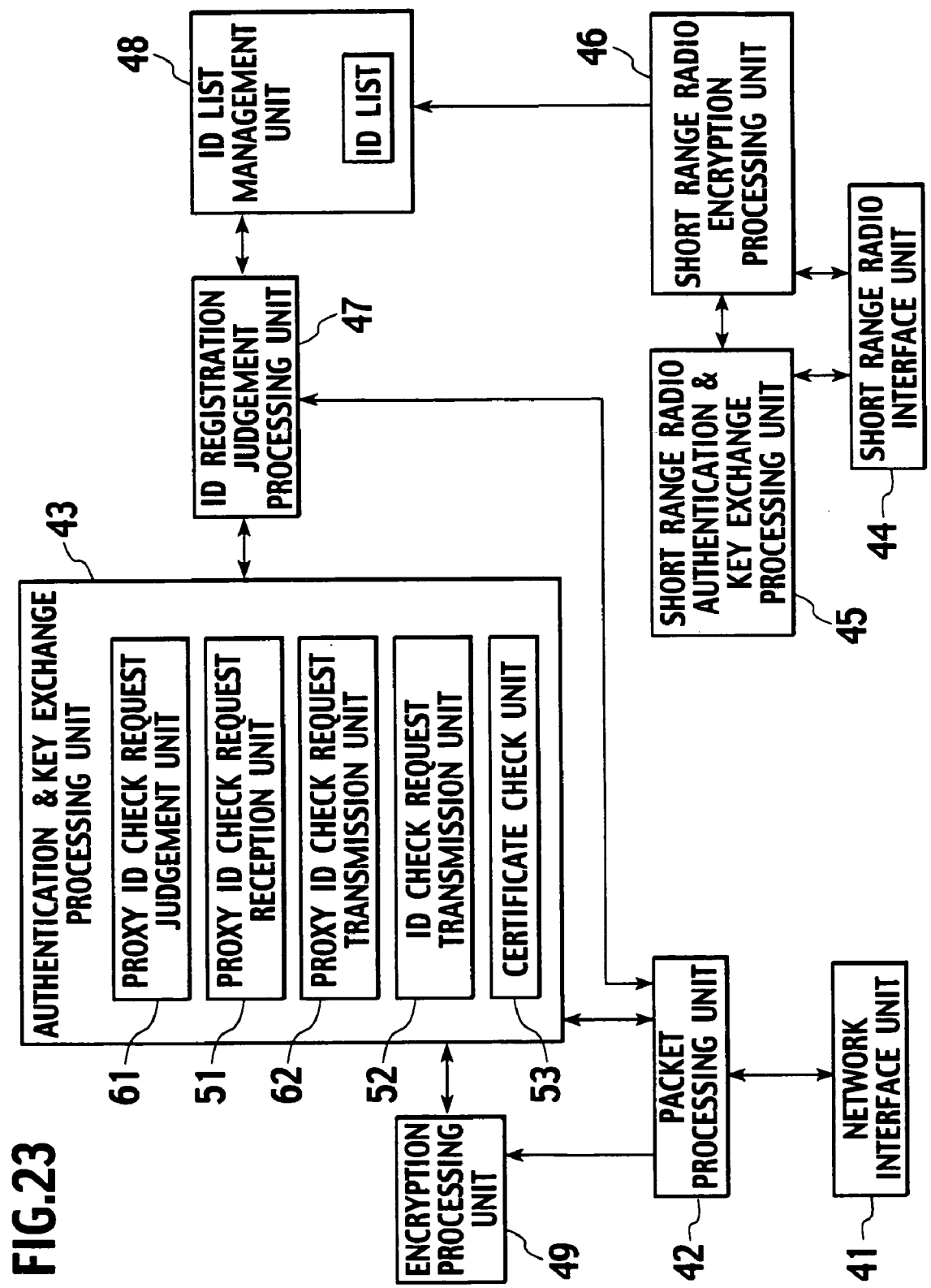
FIG. 23 is a block diagram showing an exemplary internal configuration of a bridge device according to the second embodiment of the present invention.
Figure 24:
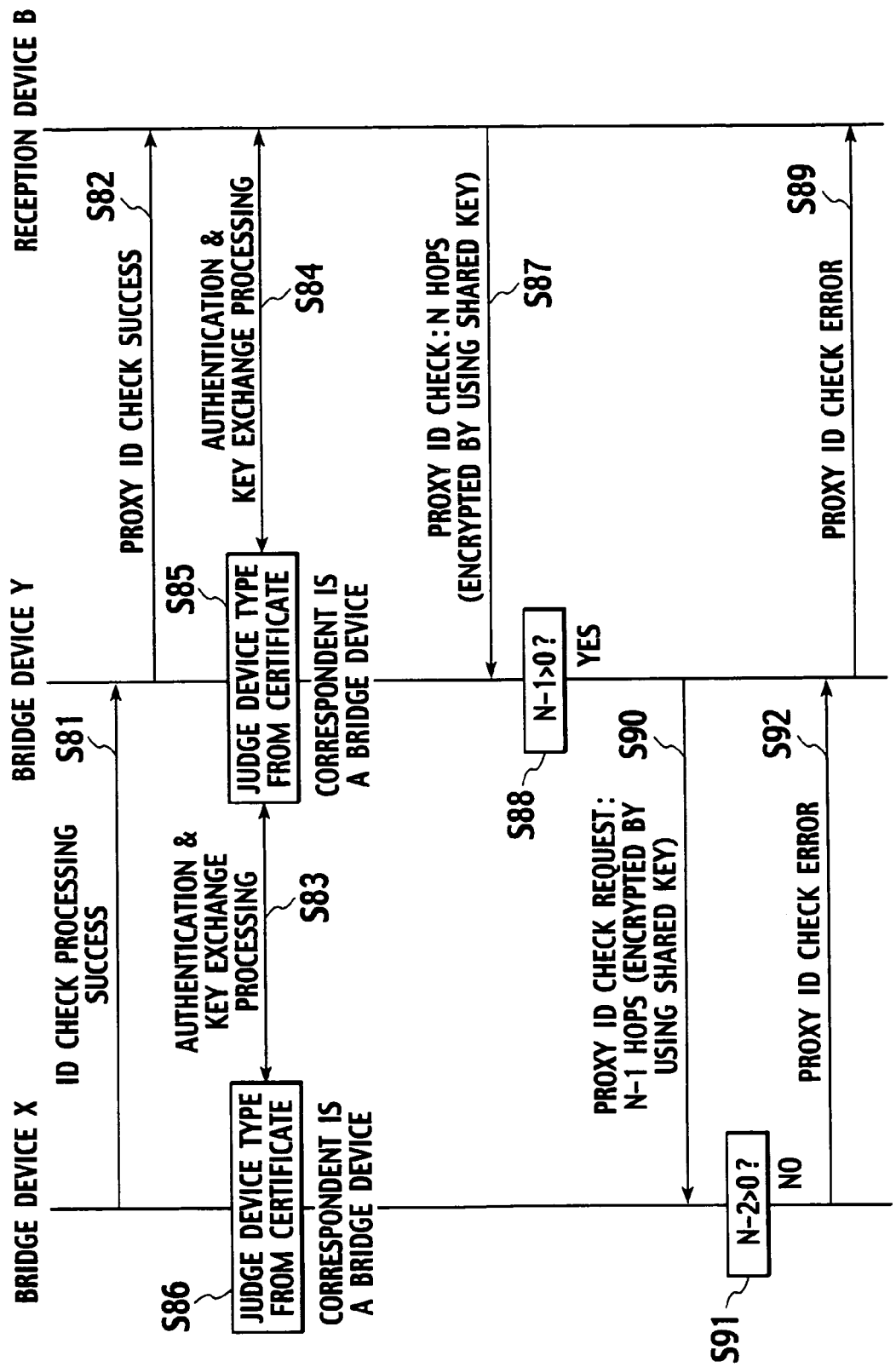
FIG. 24 is a sequence chart showing an exemplary processing procedure of a contents transfer phase in the case of using the bridge device of FIG. 23 according to the second embodiment of the present invention.
Figure 25:
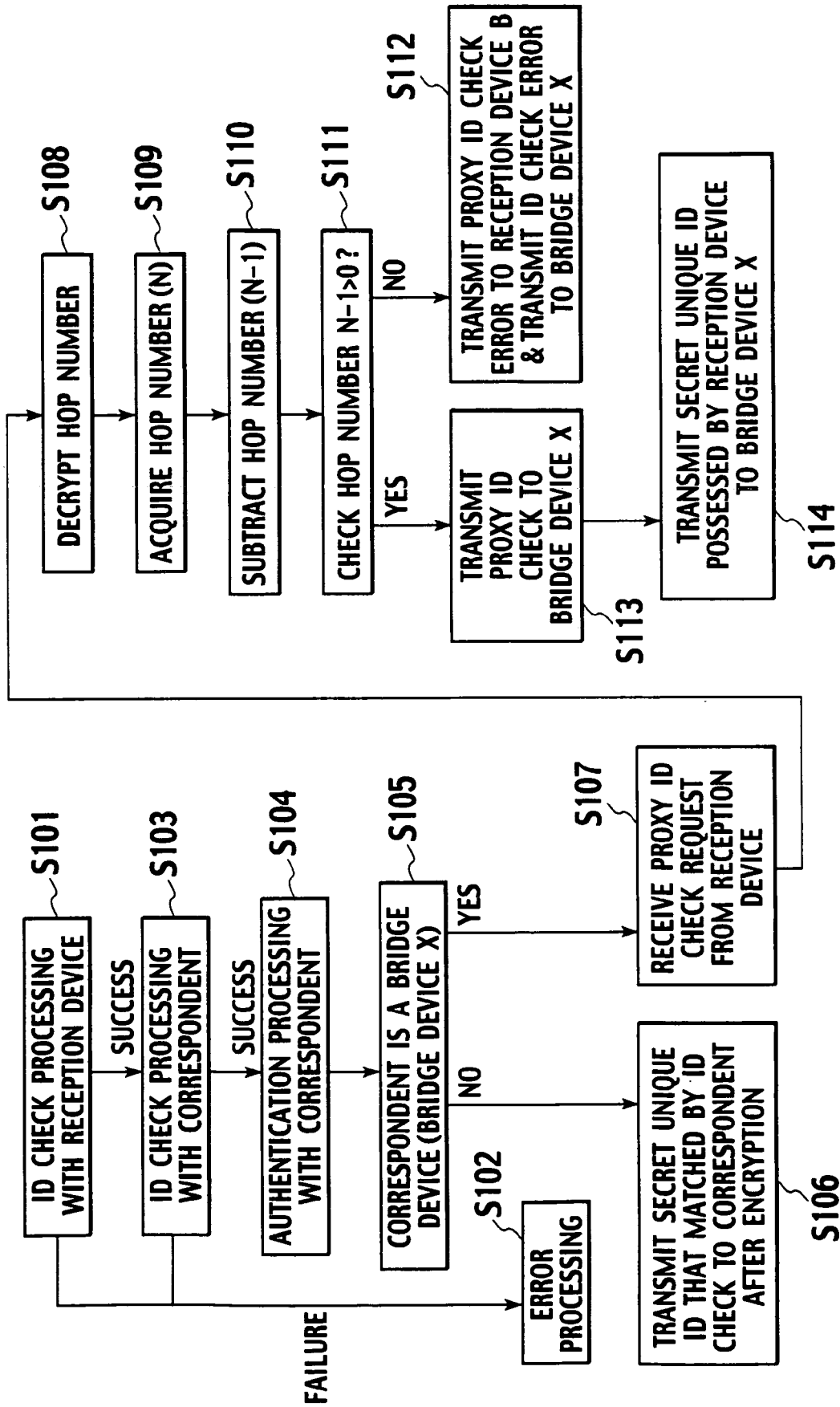
FIG. 25 is a flow chart showing a detailed processing procedure of the bridge device of FIG. 23 according to the second embodiment of the present invention.

Referring now to FIG. 23 to FIG. 25, the second embodiment of the present invention will be described in detail.

The first embodiment uses a method for preventing the bridging for a plurality of times by checking a specific field in the certificate of the device which made the proxy ID check request at a time of carrying out the proxy ID check processing by the bridge device. The second embodiment limits the number of times for the bridging by expanding a command to be exchanged between devices.

FIG. 23 shows an exemplary internal configuration of the bridge device according to the second embodiment. The bridge device of FIG. 23 differs from that of FIG. 14 in that it also has a proxy ID check request reception unit 51 for receiving the proxy ID check request that contains a hop number, a proxy ID check request judgement unit 61 for checking the hop number and carrying out an error processing if it is less than or equal to a prescribed number, and a proxy ID check request transmission unit 62 for transmitting the proxy ID check request to another bridge device by subtracting a prescribed number from the hop number.

FIG. 24 shows an exemplary processing sequence of the contents transfer phase in the case where two bridge devices are provided. The first half of the processing is the same as in the processing of FIG. 18 so that its description will be omitted here, and the processing after the ID check processing succeeded between the bridge device Y and the reception device B and between the bridge device X and the bridge device Y in FIG. 20 will be described.

The bridge device X notifies that the ID check processing succeeded to the bridge device Y (step S81), and then the bridge device Y notifies that the proxy ID check processing succeeded to the reception device B (step S82). The processing up to this point is the same as in FIG. 18. Then, the bridge device X and the bridge device Y carry out the authentication and key exchange processing (steps S83, S84), and here the bridge device Y recognizes from the certificate of the bridge device X that the correspondent is a bridge device (step S85) and the bridge device X recognizes from the certificate of the bridge device Y that the correspondent is a bridge device (step S86).

Unlike the first embodiment, the purpose of the judging processing of the steps S85 and S86 is to change the command to be transmitted after judging whether the correspondent of the authentication processing is the bridge device or not, so that the processing will continue even if the correspondent is the bridge device.

When the correspondent of the authentication processing is judged as the bridge device, the bridge device Y transmits the proxy ID check request (step S87). At this point, the hop number is included. The hop number is a value to be used in judging up to how many number of bridge devices the bridging is allowed at a time of carrying out the proxy ID check processing from the reception device B to the transmission device A.

When a certain number (one, for example) is subtracted from the hop number at the bridge device and the hop number becomes less than or equal to a prescribed threshold as a result of the subtraction, the proxy ID check request is refused (step S88). In this example, the hop number N in the proxy ID check request is transmitted from the reception device B first, and then the bridge device Y subtracts a prescribed number (which is assumed to be one here) from N (N−1). Here if the threshold is assumed to be zero, whether N−1 is greater than zero or not is judged.

If N−1 is less than or equal to zero, it is judged that the ID check processing failed, and the error processing is carried out (step S89). On the other hand, if N−1 is greater than zero, the bridge device Y makes the proxy ID check request to the bridge device X (step S90). At this point, one is subtracted from the hop number. Then, whether N−2 is greater than zero or not is judged (step S91). If N−2 is less than or equal to zero, the bridge device X transmits a message for notifying that the ID check processing failed to the bridge device Y (step S92), and upon receiving this message, the bridge device Y notifies the failure of the proxy ID check processing to the reception device B (step S89).

FIG. 25 shows a detailed processing procedure of the bridge device Y of FIG. 22. First, the bridge device Y carries out the ID check processing with the reception device B (step S101), and if the check fails, the error processing is carried out (step S102). If the check processing succeeds, the ID check processing with the transmission device A or the bridge device X (which will be referred to as a correspondent hereafter) is carried out (step S103). If the check fails, the processing proceeds to the step S102, whereas if the check succeeds, the authentication processing with the correspondent is carried out (step S104).

If the authentication succeeds, whether the correspondent is the bridge device or not is judged (step S105). If it is not the bridge device X, it is judged as the transmission device A, and the secret unique ID matched at the step S103 is encrypted and transmitted to the transmission device A (step S106). If it is the bridge device X, the proxy ID check request from the reception device B is received (step S107).

Next, the hop number N transmitted from the reception device B is decrypted (step S108), to acquire the hop number N (step S109). Then, one is subtracted from the hop number (step S110), and whether N−1 is greater than zero or not is judged (step S111). If N−1 is less than or equal to zero, the proxy ID check error is transmitted to the reception device B and the ID check error is transmitted to the bridge device X (step S112). If N−1 is greater than zero, the proxy ID check request is transmitted to the bridge device X (step S113). Then, the secret unique ID possessed by the reception device B is transmitted to the bridge device X (step S114).

As described, in the second embodiment, the hop number for limiting the number of transfers by the bridge devices is included in the control information to be transmitted and received between the devices, so that the number of bridge devices that can be passed through from the transmission device A to the reception device B can be limited flexibly. Also, according to this embodiment, there is no need to embed the hop number into the contents themselves, so that it is possible to be independent of the type of content, it is possible to suppress the amount of information to be transmitted, and it is possible to simply the processing procedures of the transmission device A and the reception device B.

In addition, one of the features of this embodiment is that the contents transfer route and the authentication route are different. Namely, in a situation where between the reception device B and the bridge device Y, and between the bridge device X and the transmission device A are connected by a network with a low bit rate such as a radio network, and between the reception device B and the transmission device A is connected by a wired network with a high bit rate, it is possible to carry out only the authentication by radio, and carry out the actual contents transfer by wire. For this reason, it is not absolutely necessary for the bridge device X and the bridge device Y to have a processing power for carrying out the high speed contents transfer, so that the manufacturing cost of the bridge devices X and Y can be reduced.

Referring now to FIG. 26 to FIG. 31, the third embodiment of the present invention will be described in detail.

In the first and second embodiments, the methods in which the bridge device limits the number of times for the bridging are described. The third embodiment is characterized in that the reception device limits the number of times for the bridging, prior to the authentication and key exchange.

Note that, in this embodiment, the exemplary case of using the configuration among the devices as shown in FIG. 20 will be described. Namely, it is assumed that the reception device B and the transmission device A do not share the common secret unique ID directly, and the transmission and reception of the contents through the bridge device X and the bridge device Y are possible.

Figure 26:
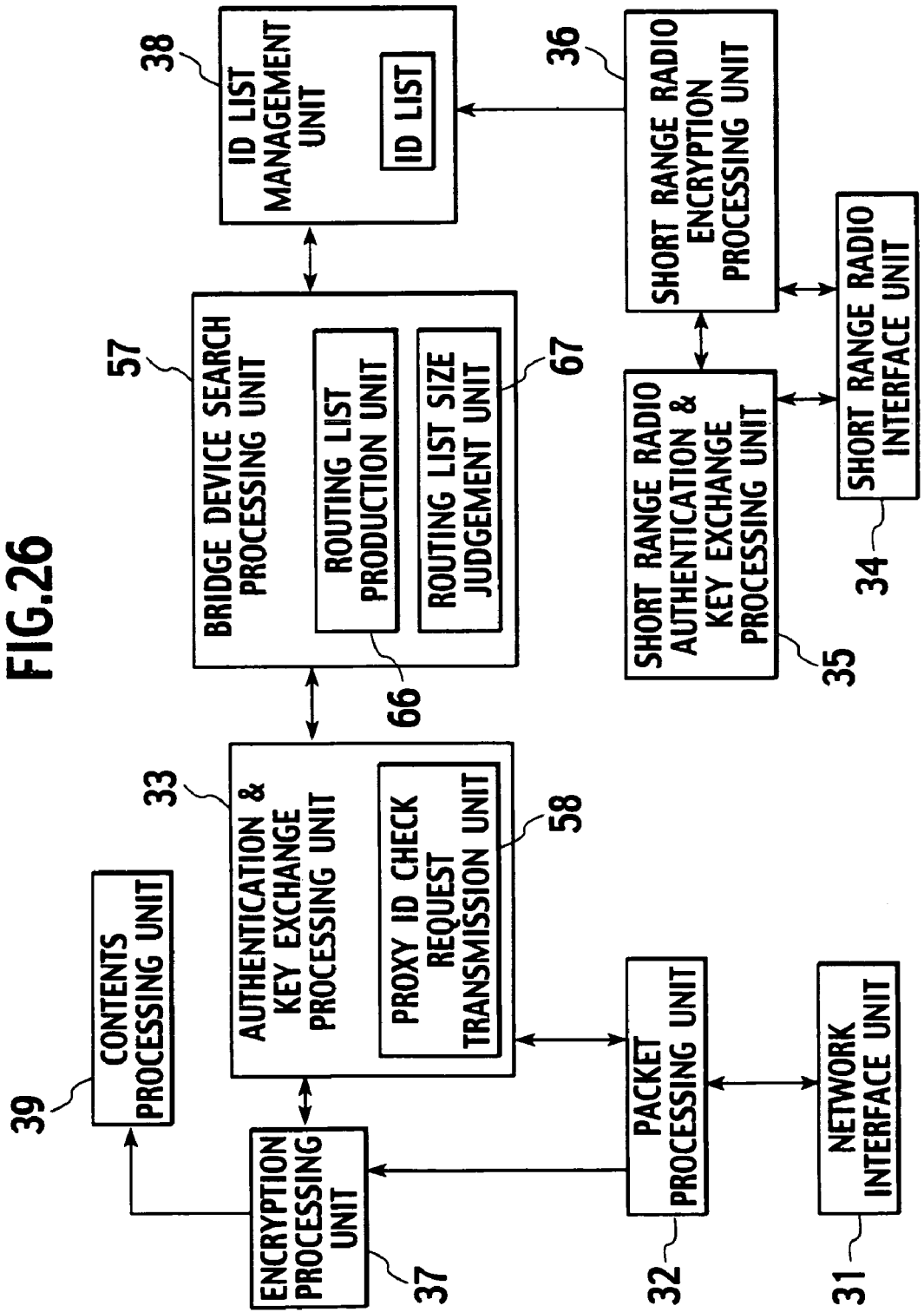
FIG. 26 is a block diagram showing an exemplary internal configuration of a reception device according to the third embodiment of the present invention.

FIG. 26 shows an exemplary internal configuration of the reception device B according to this embodiment. The reception device of FIG. 26 differs from that of FIG. 17 in that a routing table production unit 66 for producing a routing table that describes a route of the bridge devices to be passed through to reach the transmission device A in order to transmit the proxy ID check request, and a routing table size judgement unit 67 for checking whether the size of the routing table is less than or equal to a certain size or not, are newly provided in the bridge device search processing unit 57.

Figure 27:
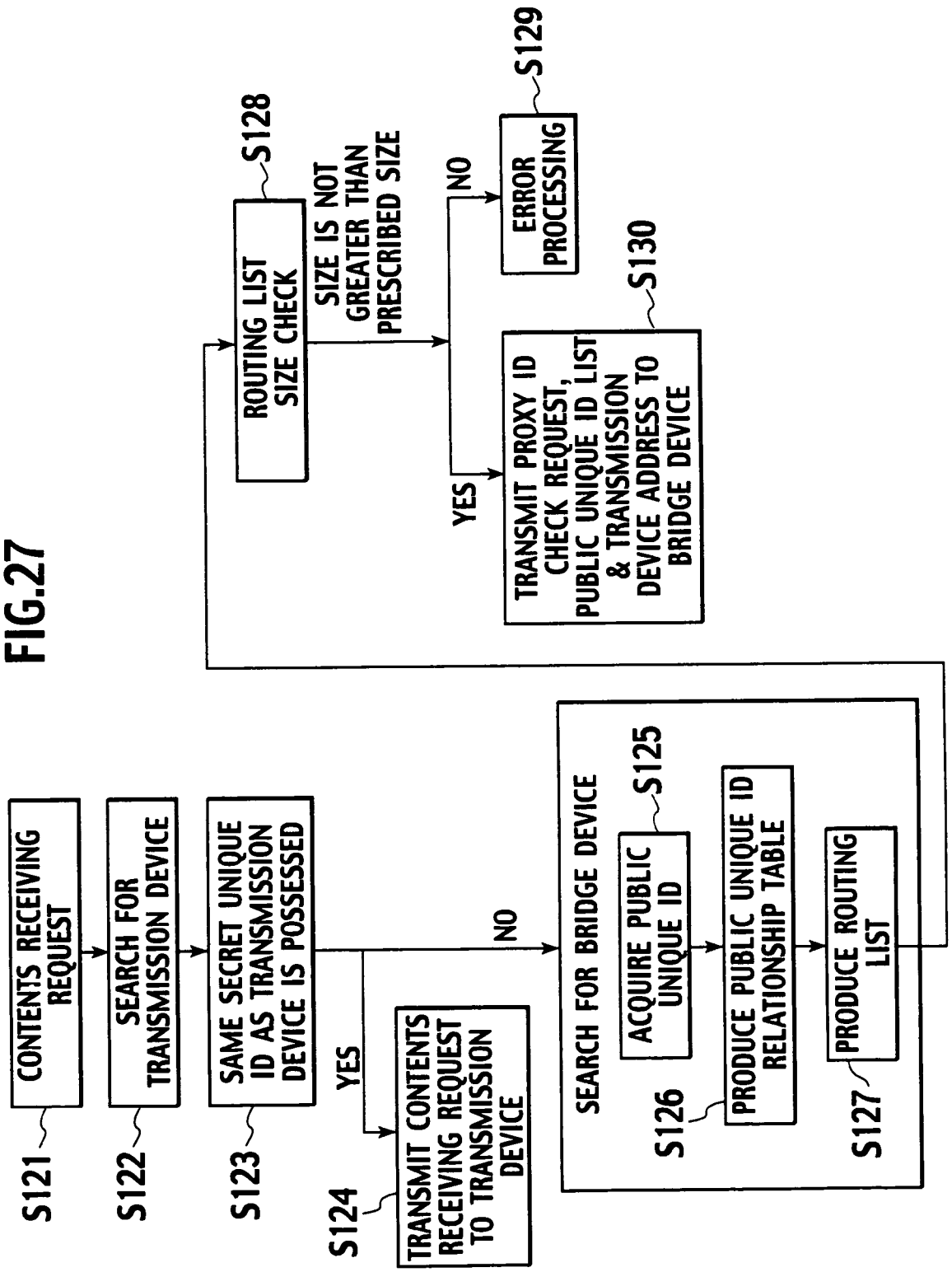
FIG. 27 is a flow chart showing an exemplary processing procedure of the reception device of FIG. 26 according to the third embodiment of the present invention.

FIG. 27 shows an exemplary processing sequence of the reception device B according to this embodiment. The reception device B issues a contents receiving request command (step S121), analyzes to which transmission device the command is directed (step S122), and carries out the search processing to check whether the same ID as the secret unique ID contained in the ID list of the transmission device A is contained in the own ID list or not (step S123).

The ID list has a configuration as shown in FIG. 6, so that it suffices to use the unique information generic to devices such as the MAC address or the IP address of the transmission device A as a search key. If the reception device B possesses the secret unique ID common to the transmission device A, it suffices to carry out the authentication and key exchange processing directly according to the procedure shown in FIG. 8 (step S124). If the reception device B and the transmission device A do not share the secret unique ID, the authentication and key exchange processing is to be carried out through the bridge devices.

First, the reception device B carries out a route search processing to ascertain by which route the authentication and key exchange processing should be carried out indirectly with the transmission device A through the bridge devices (steps S125 to S127). This route search processing comprises three procedures of (1) a public unique ID acquisition (step S125), (2) a public unique ID relationship table production (step S126), and (3) a routing table production (step S127). Here, the routing table indicates a route for the authentication that is necessary from the reception device B to reach the bridge device X.

(1) In the public unique ID acquisition, the information regarding which device is registered by which short range radio device is collected. For this information to be collected, it suffices to use the public unique ID. The public unique ID is not a value to be kept secret from devices other than the transmission device A, the reception device B and the bridge devices, so that it suffices to search the public unique ID through the network by setting the public unique ID in pair with the IP addresses or the MAC addresses of the transmission device A and the bridge devices, for example. For this search, if the broadcast IP address is used, a message for requesting the transmission of the public unique ID to devices connected within the same sub-net is transmitted such that a device which received this message returns the public unique ID of the own device along with the MAC or IP address of the own device.

(2) In the public unique ID relationship table production, a list of each of the MAC address and the public unique ID obtained by (1) are tabulated into a table. FIG. 28 shows an example of the public unique ID relationship table. In FIG. 28, the device address indicates the MAC address or the IP address unique to the network interface of the device, for example. From this public unique ID relationship table, it is possible to ascertain which device has which secret unique ID, that is which device is registered by which short range radio device.

(3) In the routing table production, using the public unique ID relationship table produced by (2), by which route the proxy ID check request should be transmitted from the own device in order to share the key with the target transmission device A is searched. For example, from the public unique ID relationship table shown in FIG. 28, it can be seen that, from the reception device B to the transmission device A, the authentication and key exchange processing should be carried out in an order of the bridge device Y, the bridge device X, so that the routing table as shown in FIG. 29 can be produced.

Next, the reception device B checks the size of the produced routing table (step S128). In an example shown in FIG. 29, there is a need to pass through two bridge devices to reach the target transmission device A. Here, if the number of bridge devices is to be limited to one, this size check fails and the error processing is carried out (step S129). On the other hand, if the number of bridge devices is permitted up to two and the size of the routing table is less than or equal to a prescribed size, the proxy ID check request, the public unique ID list and the address of the transmission device A are transmitted to the bridge device Y (step S130).

FIG. 30 shows an example of the proxy ID check request command to be transmitted by the reception device B to the bridge device Y. The proxy ID check request command of FIG. 30 contains a command destination address (the address of the bridge device Y in this case), a command source address (the address of the reception device B in this case), the public unique ID list (ZZ in this case), the address of the first relay host (the address of the bridge device X in this case), and the address of the second relay host (the address of the transmission device A in this case).

The bridge device Y receives the command shown in FIG. 30 from the reception device B, carries out the processing shown in FIG. 27, and transmits the proxy ID check request command to the bridge device X.

FIG. 31 shows an example of the proxy ID check request command to be transmitted by the bridge device Y to the bridge device X. The proxy ID check request command of FIG. 31 contains a command destination address (the address of the bridge device X in this case), the public unique ID list (YY and ZZ in this case), and the address of the second relay host (the address of the transmission device A in this case).

Note that, in this example, the case of transmitting the proxy ID check request from the reception device B to the transmission device A has been described, but in the case of transmitting the proxy ID check request from the transmission device A to the reception device B, the bridge search processing and the routing table size check processing are carried out by the transmission device A.

As described, in the third embodiment, the reception device B limits the size of the routing table such that it becomes possible to limit the number of times for the bridging, prior to the transmission of the proxy ID check request and the authentication and key exchange. According to this embodiment, it is possible to avoid the unnecessary transmission and reception of the proxy ID check request so that it is possible to reduce the network load and the device processing load.

Figure 32:
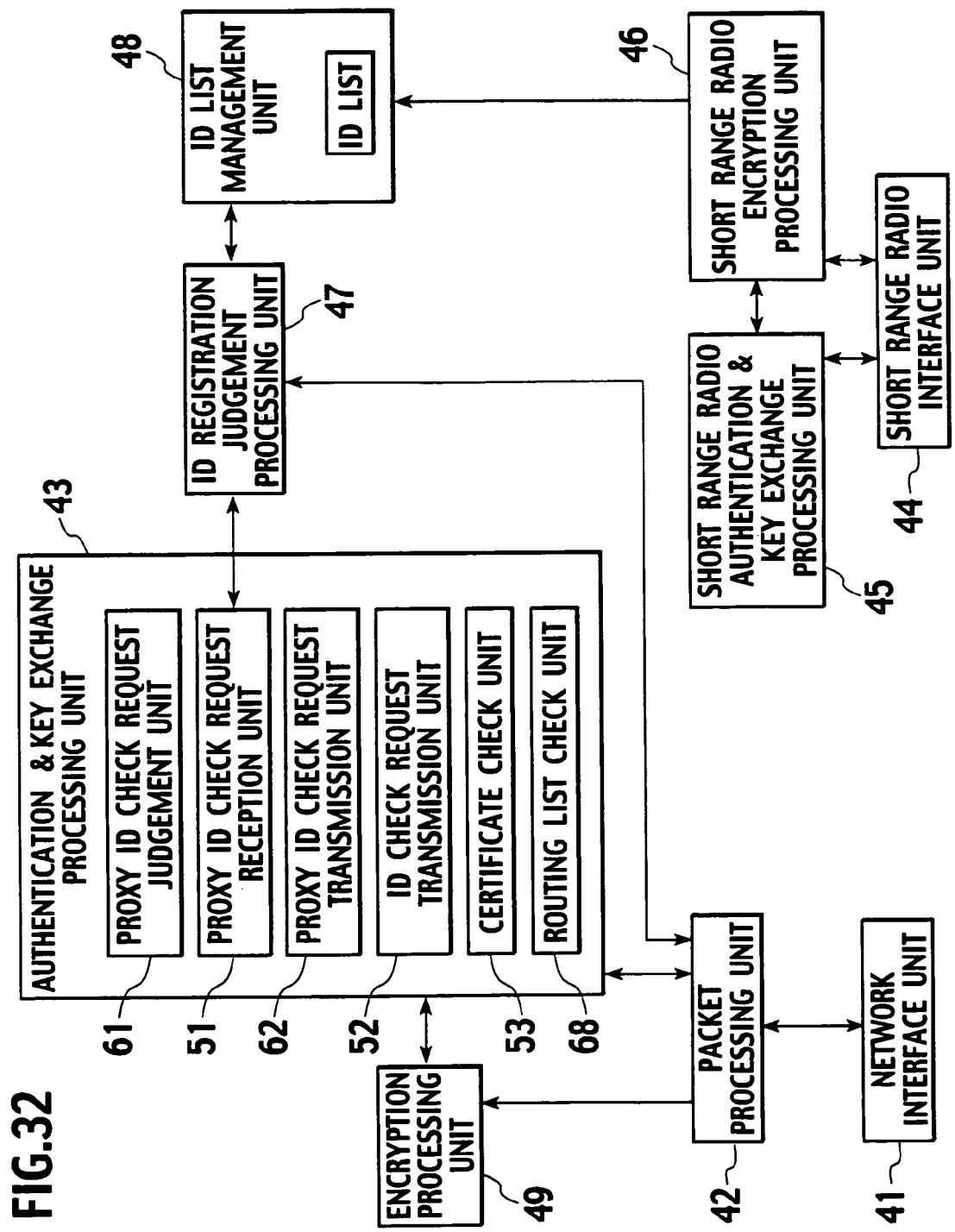
FIG. 32 is a block diagram showing an exemplary internal configuration of a bridge device according to the fourth embodiment of the present invention.
Figure 33:
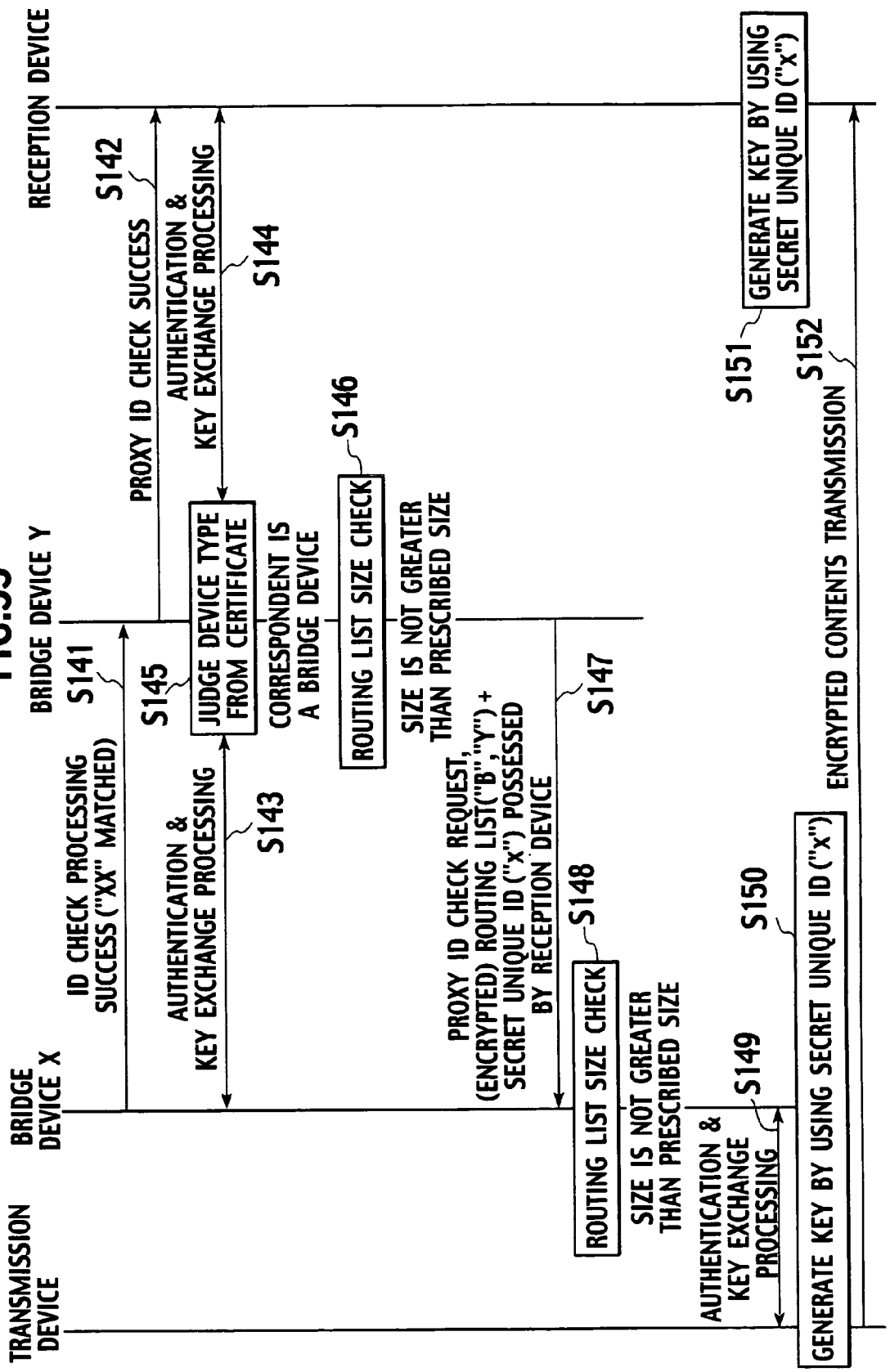
FIG. 33 is a sequence chart showing an exemplary processing procedure of a contents transfer phase in the case of using the bridge device of FIG. 32 according to the fourth embodiment of the present invention.
Figure 34:
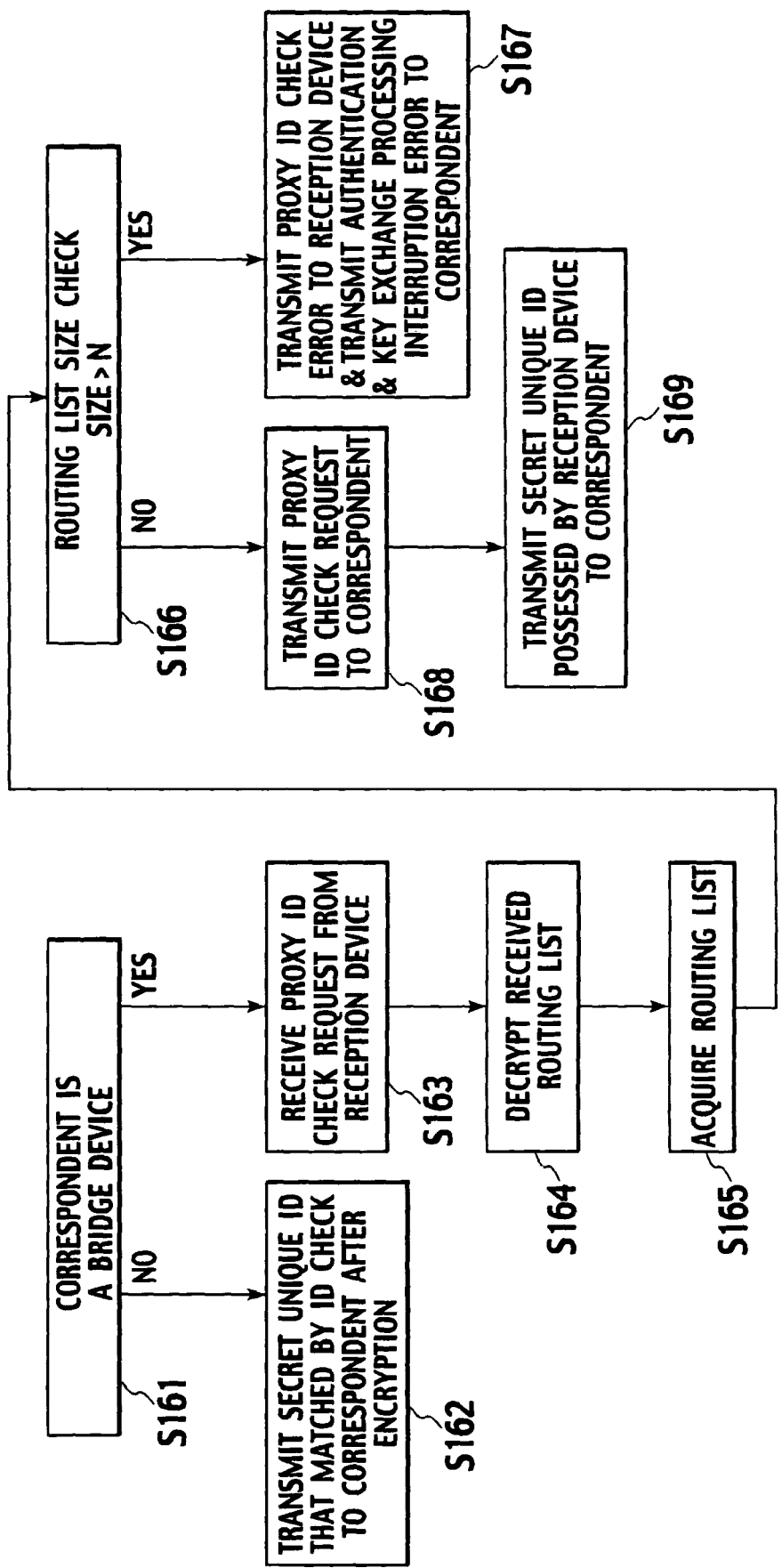
FIG. 34 is a flow chart showing an exemplary processing procedure of the bridge device of FIG. 32 according to the fourth embodiment of the present invention.

Referring now to FIG. 32 to FIG. 34, the fourth embodiment of the present invention will be described in detail.

In the third embodiment, the method in which the reception device B checks the routing list size and interrupts the transmission of the proxy ID check request if the size is less than or equal to a prescribed size is described. In the fourth embodiment, the bridge device checks the routing lists passed through until then after the authentication and key exchange processing. The routing list contains IDs of the reception device B and the bridge device Y. For the IDs to be contained in the routing list, it suffices to use a value in the ID field contained in the certificate as shown in FIG. 15 which is utilized in the authentication and key exchange processing, for example.

FIG. 32 shows an exemplary internal configuration of the bridge device according to the fourth embodiment. The bridge device of FIG. 32 differs from that of FIG. 21 in that it has a routing list check unit 68 in the authentication and key exchange processing unit 43.

FIG. 33 shows an exemplary processing sequence in the case where the bridge devices X and Y carry out the routing list size check. Before the processing of FIG. 33, the processing similar to that of FIG. 18 and up to the step S63 of FIG. 21 is to be carried out but its description will be omitted here.

When the bridge device X notifies the success of the ID check processing to the bridge device Y (step S141), the bridge device Y notifies this fact to the reception device B (step S142). Then, the authentication and key exchange processing is carried out between the bridge devices X and Y (step S143), and the authentication and key exchange processing is also carried out between the bridge device Y and the reception device B (step S144). Here, the bridge device Y recognizes from the certificate of the bridge device X that the bridge device is a bridge device (step S145), and carries out the routing list size check (step S146).

If the size is less than or equal to a prescribed size, the bridge device Y makes the proxy ID check request to the bridge device X (step S147). At this point, the routing list and the secret unique ID possessed by the reception device B are encrypted and transmitted.

The bridge device X carries out the size check of the routing list received from the bridge device Y (step S148), and if the size is less than or equal to a prescribed size, the authentication and key exchange processing is carried out between the bridge device X and the transmission device A (step S149). Then, the bridge device X and the transmission device A generate the key by using the common secret unique ID (step S150), while the reception device B also generates the key by using the common secret unique ID (S151), and the encrypted contents encrypted by using the generated key are transmitted from the transmission device A to the reception device B (step S152).

FIG. 34 shows an exemplary processing sequence of the bridge device Y. First, whether the correspondent is a bridge device or not is judged (step S161), and if the correspondent is not a bridge device, the secret unique ID matched by the ID check processing is encrypted and transmitted (step S162).

If the correspondent is a bridge device, the proxy ID check request from the reception device B is received (step S163). Then, the received routing list is decrypted (step S164), and the routing list is acquired (step S165). The routing list contains IDs of the reception device B and the bridge device Y. Whether the size of the routing list is greater than a prescribed size is judged (step S166), and if the size is greater, the proxy ID check error is transmitted to the reception device B and the authentication and key exchange processing interruption error is also transmitted to the correspondent (step S167).

If the size of the routing list is less than or equal to a prescribed size, the proxy ID check request is transmitted to the correspondent (step S168), and the secret unique ID possessed by the reception device B is encrypted and transmitted to the correspondent (step S169).

As described, the reception device according to the fourth embodiment transmits the proxy ID check request to the bridge device which is registered by the same short range radio device X and for which the number of times of the authentication bridging becomes minimum (or the largest number of devices are expected to be registered). This is particularly significant in the case where the network configuration is dynamically changed. In the case of the home network device, the power is often turned off. For this reason, the bridge device that was active at a certain date and time is not necessarily active at some other time. Even in the case where the home network configuration is dynamically changed as such, according to this embodiment, it is possible to transmit the proxy ID check request to the bridge device for which the number of times of the authentication bridging becomes minimum so that the communications can be carried out efficiently.

As described above, according to the present invention, the communications between the first and second communication devices are made possible only when a prescribed condition is satisfied, so that it becomes possible to carry out the contents transfer between different communication devices while protecting the copyrights, and it is possible to realize the effective utilization of the contents and the improvement of the user's convenience.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A bridge device for bridging between communication devices in an information processing system in which a range of information transfer between communication devices through a network is limited within a prescribed range by registering, in each of the communication devices, unique information which is unique to a short range communication device connectable to the each of the communication devices and permitting information transfer between communication devices which share common unique information, where the unique information is formed by a pair of a public unique information and a secret unique information, and where the registration of the unique information is performed by transmitting the unique information of the short range communication device to the each of the communication devices through short range communication of the short range communication device, the bridge device comprising:

a unique information storing unit configured to store pairs of the public unique information and the secret unique information of different short range communication devices registered by the bridge device through the short range communication of the short range communication devices respectively;

a proxy check request receiving unit configured to receive a proxy check request for determining, in place of the communication devices, whether to permit information transfer on the basis of the public unique information stored in the unique information storing unit, the public unique information registered by a first communication device, and an address information of a second communication device which is an intended correspondent of the first communication device, from the first communication device;

a first judgment unit configured to judge whether the public unique information registered by the first communication device is the public unique information of one of the different short range communication devices;

a second judgment unit configured to receive the public unique information from the second communication device, and judge whether the public unique information received from the second communication device is the public unique information of one of the different short range communication devices or not;

a device type judgment unit configured to judge whether the second communication device is another bridge device or not, when the first judgment unit judges that the public unique information registered by the first communication device is registered in the unique information storing unit and the second judgment unit judges that one public unique information registered in the unique information storing unit is registered by the second communication device; and a unique information transmission determining unit configured to determine transmission of the secret unique information registered by the first communication device to the second communication device after confirming that each of the first and second communication devices registers the unique information of any one of the different short range communication devices, according to a judgment result of the device type judgment unit, wherein the communication of the short range communication device is based on a physical layer and a datalink layer, and the communication among the first and second communication devices and the bridge device is based on a network layer and a transport layer.

2. The bridge device of claim 1, wherein the unique information transmission determining unit is configured to determine not to transmit the secret unique information registered by the first communication device to the second communication device, when the device type judgment unit judges that the second communication device is an other bridge device.

3. The bridge device of claim 1, further comprising:

a hop number judgment unit configured to judge whether a hop number is less than a prescribed threshold or not, when the device type judgment unit judges that the second communication device is an other bridge device, the hop number indicating a number of other bridge devices which relayed the proxy check request before the proxy check request reaches to the bridge device;

wherein the unique information transmission determining unit is configured to determine to transmit the secret unique information registered by the first communication device to the second communication device when the hop number judgment unit judges that the hop number is less than the prescribed threshold, and determine not to transmit the secret unique information registered by the first communication device to the second communication device when the hop number judgment unit judges that the hop number is not less than the prescribed threshold.

4. The bridge device of claim 1, further comprising:

a routing list size judgment unit configured to judge whether a size of a routing list is less than a prescribed size or not, when the device type judgment unit judges that the second communication device is an other bridge device, the routing list indicating a route by which the second communication device can be reached from the first communication device;

wherein the unique information transmission determining unit is configured to determine to transmit the secret unique information registered by the first communication device to the second communication device when the routing list size judgment unit judges that the size of the routing list is less than the prescribed size, and determine not to transmit the secret unique information registered by the first communication device to the second communication device when the routing list size judgment unit judges that the size of the routing list is not less than the prescribed size.

5. The bridge device of claim 1, wherein the second judgment unit comprises:

a check request unit configured to request the second communication device to check whether any public unique information registered in the unique information storing unit is registered by the second communication device or not, by transmitting the public unique information stored in the unique information storing unit to the second communication device, when the first judgment unit judges that the public unique information registered by the first communication device is registered in the unique information storing unit; and a check result receiving unit configured to receive a check result which is obtained by the second communication device in response to the check request unit, and which indicates whether any public unique information registered in the unique information storing unit is registered by the second communication device or not.

6. The bridge device of claim 1, further comprising:

a first interface unit configured to receive a pair of the public unique information and the secret unique information possessed by a specific device, from the specific device, in a form in which at least the secret unique information is encrypted; and a second interface unit configured to exchange the public unique information and the secret unique information possessed by the specific device in a form in which at least the secret unique information is encrypted, between the first communication device and the second communication device through the network;

wherein the unique information storing unit is configured to store the public unique information and the secret unique information received by the first interface unit as the public unique information and the secret unique information registered by the bridge device.

7. The bridge device of claim 6, wherein the first interface unit is configured to receive a pair of the public unique information and the secret unique information possessed by the specific device which is capable of communicating only with devices located within a limited range around the specific device.

8. The bridge device of claim 6, wherein the first interface unit is configured to receive a pair of the public unique information and the secret unique information possessed by the specific device which is an accessory to each communication device connected to the network which is a home network, and the bridge device functions as a home server.

9. A communication device in an information processing system in which a range of information transfer between communication devices through a network is limited within a prescribed range by registering, in each of the communication devices, unique information which is unique to a short range communication device connectable to the communication devices and permitting information transfer between communication devices which share common unique information, where the unique information is formed by a pair of a public unique information and a secret unique information, and where the registration of the unique information is performed by transmitting the unique information of the short range communication device to the each of the communication devices through short range communication of the short range communication device, the communication device comprising:

a unique information storing unit configured to store a pair of the public unique information and the secret unique information of a short range communication device transmitted from the short range communication device to the communication device through the short range communication of the short range communication device;

a check unit configured to check whether the secret unique information registered in the unique information storing unit is registered by an other communication device which is an intended correspondent of the communication device or not;

a route search unit configured to produce a routing list indicating a route by which the other communication device can be reached from the communication device, by searching at least one bridge device for bridging between the communication device and the other communication device, when the check unit indicates that the secret unique information registered in the unique information storing unit is not registered by the other communication device;

a routing list size judgment unit configured to judge whether a size of the routing list is less than or equal to a prescribed size or not; and a proxy check request transmission unit configured to transmit a proxy check request for determining whether to permit information transfer in place of the communication devices, the public unique information registered by the communication device, and an address information of the other communication device, to a first bridge device on the route when the routing list size judgment unit judges that the size of the routing list is less than or equal to the prescribed size, wherein the communication of the short range communication device is based on a physical layer and a datalink layer, and the communication among the communication devices and the bridge devices is based on a network layer and a transport layer.

10. The communication device of claim 9, further comprising:

a first interface unit configured to receive a pair of the public unique information and the secret unique information possessed by a specific device, from the specific device, in a form in which at least the secret unique information is encrypted; and a second interface unit configured to exchange encrypted contents with other communication devices through the network;

wherein the unique information storing unit is configured to store the public unique information and the secret unique information received by the first interface unit as the public unique information and the secret unique information registered by the communication device.

11. The communication device of claim 10, wherein the first interface unit is configured to receive a pair of the public unique information and the secret unique information possessed by the specific device which is capable of communicating only with devices located within a limited range around the specific device.

12. The communication device of claim 10, wherein the first interface unit configured to receive a pair of the public unique information and the secret unique information possessed by the specific device which is an accessory to the communication device connected to the network which is a home network, and the bridge device functions as a home server.

13. A method for controlling a bridge device for bridging between communication devices in an information processing system in which a range of information transfer between communication devices through a network is limited within a prescribed range by registering, in each of the communication devices, unique information which is unique to a short range communication device connectable to the each of the communication devices and permitting information transfer between communication devices which share common unique information, where the unique information is formed by a pair of a public unique information and a secret unique information, and where the registration of the unique information is performed by transmitting the unique information of the short range communication device to the each of the communication devices through short range communication of the short range communication device, the method comprising:

- storing pairs of the public unique information and the secret unique information of different short range communication devices registered by the bridge device through the short range communication of the short range communication devices respectively;
- receiving a proxy check request for determining, in place of the communication devices, whether to permit information transfer on the basis of the public unique information stored in the unique information storing unit, the public unique information registered by a first communication device, and an address information of a second communication device which registers the public unique information of another of the different short range communication devices and is an intended correspondent of the first communication device, from the first communication device;
- first judging whether the public unique information registered by the first communication device is the public unique information of one of the different short range communication devices or not;
- receiving the public unique information of the another of the different short range communication devices from the second communication device;
- receiving the public unique information from the second communication device;
- second judging whether the public unique information received from the second communication device is the public unique information of one of the different short range communication devices or not;
- third judging whether the second communication device is another bridge device or not, when the first judging judges that the public unique information registered by the first communication device is registered by the storing and the second judging judges that one public unique information registered by the storing is registered by the second communication device; and
- determining whether or not to transmit the secret unique information registered by the first communication device to the second communication device, after confirming that each of the first and second communication devices register the unique information of any one of the different short range communication devices, according to a judgment result of the third judging,
- wherein the communication of the short range communication device is based on a physical layer and a datalink layer, and the communication among the first and second communication devices and the bridge device is based on a network layer and a transport layer.

14. A method for controlling a communication device in an information processing system in which a range of information transfer between communication devices through a network is limited within a prescribed range by registering, in each of the communication devices, unique information which is unique to a short range communication device connectable to the communication devices and permitting information transfer between communication devices which share common unique information, where the unique information is formed by a pair of a public unique information and a secret unique information, and where the registration of the unique information is performed by transmitting the unique information of the short range communication device to the each of the communication devices through short range communication of the short range communication device, the method comprising:

- storing the public unique information and the secret unique information of a short range communication device transmitted from the short range communication device to the communication device through the short range communication of the short range communication device;
- checking whether the secret unique information registered by the storing is registered by an other communication device which is an intended correspondent of the communication device or not;
- producing a routing list indicating a route by which the other communication device can be reached from the communication device, by searching at least one bridge device for bridging between the communication device and the other communication device, when the checking indicates that the secret unique information registered in the unique information storing unit is not registered by the other communication device;
- judging whether a size of the routing list is less than or equal to a prescribed size or not; and
- transmitting a proxy check request for determining whether to permit information transfer in place of the communication devices, the public unique information registered by the communication device, and an address information of the other communication device, to a first bridge device on the route when the judging judges that the size of the routing list is less than or equal to the prescribed size,
- wherein the communication of the short range communication device is based on a physical layer and a datalink layer, and the communication among the communication devices and the bridge devices is based on a network layer and a transport layer.

* * * * *